(12) United States Patent
Frey

(10) Patent No.: US 12,541,026 B2
(45) Date of Patent: Feb. 3, 2026

(54) COHERENT LIDAR IMAGING SYSTEM

(71) Applicant: COMMISSARIAT A L'ENERGIE ATOMIQUE ET AUX ENERGIES ALTERNATIVES, Paris (FR)

(72) Inventor: Laurent Frey, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 784 days.

(21) Appl. No.: 17/758,771

(22) PCT Filed: Jan. 14, 2021

(86) PCT No.: PCT/EP2021/050681
§ 371 (c)(1),
(2) Date: Jul. 13, 2022

(87) PCT Pub. No.: WO2021/144357
PCT Pub. Date: Jul. 22, 2021

(65) Prior Publication Data
US 2023/0048766 A1 Feb. 16, 2023

(30) Foreign Application Priority Data

Jan. 16, 2020 (FR) .................................. 2000408

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4811* (2013.01); *G01S 7/4814* (2013.01);
(Continued)

(58) Field of Classification Search
CPC ........ G01S 17/89; G01S 17/34; G01S 7/4811; G01S 7/4814; G01S 7/4818; G01S 7/4917; G02B 6/34
See application file for complete search history.

(56) References Cited

U.S. PATENT DOCUMENTS

| 5,610,705 A | * | 3/1997 | Brosnan | ................... | G01S 17/89 |
| | | | | | 356/28.5 |
| 2006/0227316 A1 | * | 10/2006 | Gatt | ....................... | G01S 7/4811 |
| | | | | | 356/5.11 |

(Continued)

FOREIGN PATENT DOCUMENTS

| GB | 2265514 A | * | 9/1993 | ............. | G01S 17/89 |
| WO | WO 2019/041274 A1 | | 3/2019 | | |

OTHER PUBLICATIONS

Brian W. Krause et al. "Motion compensated frequency modulated continuous wave 3D coherent imaging ladar with scannerless architecture" *Applied Optics, Optical Society of America*, Washington, DC, US, vol. 51, No. 36, Dec. 20, 2012, pp. 8745-8761, XP-001580743.

(Continued)

*Primary Examiner* — Isam A Alsomiri
*Assistant Examiner* — Benjamin Wade Clouser
(74) *Attorney, Agent, or Firm* — Oblon, McClelland, Maier & Neustadt, L.L.P.

(57) ABSTRACT

A coherent LIDAR imaging system includes a laser source; an optical splitter/recombiner designed to split the laser radiation into a reference beam and into an object beam and to superpose the reference beam on a reflected object beam reflected by the scene; and an optical imager creating an image of the scene on a detector. The detector includes an array of pixels designed for detecting the reflected object beam and the reference beam which together form a recombined beam having a beat frequency representative of a range of the illuminated scene. The optical splitter/recom- (Continued)

biner is configured to form an intermediate image of the reference beam in an intermediate image plane perpendicular to the optical axis.

17 Claims, 14 Drawing Sheets

(51) Int. Cl.
G01S 7/4912 (2020.01)
G01S 17/34 (2020.01)
G01S 17/894 (2020.01)
G02B 6/34 (2006.01)

(52) U.S. Cl.
CPC .......... *G01S 7/4818* (2013.01); *G01S 7/4917* (2013.01); *G01S 17/34* (2020.01); *G01S 17/894* (2020.01); *G02B 6/34* (2013.01)

(56) References Cited

U.S. PATENT DOCUMENTS

2012/0274937 A1* 11/2012 Hays ................. G01S 17/95
356/450
2017/0118423 A1 4/2017 Zhou et al.
2018/0232048 A1 8/2018 Popovich et al.

OTHER PUBLICATIONS

Markus-Christian Amann et al. "Laser ranging: a critical review of usual techniques for distance measurement" *Optical Engineering, Society of Photo-Optical Instrumentation Engineers*, Bellingham vol. 40, No. 1, Jan. 1, 2001, pp. 10-19, XP-001092786.
International Search Report mailed on Mar. 16, 2021 in PCT/EP2021/050681 filed on Jan. 14, 2021 (3 pages).

* cited by examiner

COHERENT LIDAR IMAGING SYSTEM

TECHNICAL FIELD

The present invention relates to the field of the imaging of a scene that is to be observed by a coherent LIDAR and more particularly in the field of heterodyne detection coherent LIDAR three-dimensional imaging.

PRIOR ART

The heterodyne detection LIDAR (light detection and ranging) imaging of a scene makes use of the coherent emission nature of a laser source to amplify the useful signal reflected by the scene using a signal coming from a reference path and coherent with the useful signal.

In the FMCW-type LIDAR technique, the optical frequency of the laser source is modulated, for example with a periodic linear ramp. The light coming from the laser source is divided into two paths. Part of the light (object path) is projected onto a point in the scene where it is backscattered, partially toward a photodetector. The other part (reference path) is sent to the photodetector without passing via the scene. The two paths interfere on the photodetector and form a heterodyne signal. The interference produces beats of a frequency proportional to the delay between the two paths, and therefore proportional to the range between the scene and the photodetector. More specifically, for a linear ramp, the beat frequency of the oscillations is $$f_R = \frac{2Bz}{cT}$$

and where B is the optical frequency excursion (or chirp) during the duration T of the ramp, z is the range and c is the speed of light. The range z is deduced from the number N (N≈T×$f_R$) of periods measured during the duration $$T:z \approx \frac{Nc}{2B}.$$

The resolution in terms of range is $$\delta z \approx \frac{c}{2B}.$$

It is also possible to measure the beat frequency $f_R$ using spectral analysis by performing a Fourier transform on the heterodyne signal. The FMCW type LIDAR technique is an optical heterodyne measurement technique insofar as it involves a number of optical frequencies.

The heterodyne signal (i.e. the interference signal) contains a continuous component, which is generally large and not useful, which is eliminated by a high pass electronic filter if the photoreceiver is a photodiode. In fiber setups, it is practical to use a 3 dB coupler which, from two, object and reference, input paths, supplies two output signals in phase opposition which illuminate two photodiodes in series (balanced photodiodes). The detection circuit is able to calculate the difference between the two photocurrents, and therefore eliminate the DC part (common mode) and detect the AC part. The AC part is generally amplified externally by a trans-impedance amplifier (TIA) before being processed by external electronics, for example an oscilloscope, in order to measure the beat frequency $f_R$. Once the measurement has been performed, there is a change in point, which means to say that a sequential spatial scan of the scene is made.

This technique works well because the reference path does not suffer the significant losses of backscattering, and serves to amplify the signal received by the interferometric mixing that multiples the amplitude of the useful signal. However, the image obtained is in principle of the "rolling shutter" type, which means that the pixels are read sequentially, given that it is necessary to scan the scene in order to create a complete image thereof. This technique is therefore disrupted by image distortion when the scene contains moving objects.

A sequential scanning FMCW-type LIDAR imaging system is not really very compatible with use at video speeds (typically 50 Hz, namely 20 ms per image). For example, for an image in a QVGA format (320×240, namely approximately 76800 pixels), it is necessary to change point every 260 ns and therefore create at least a ramp in T=260 ns, which requires a laser modulation frequency of several MHz, and even several tens of MHz with linear ramps. These values are at the limit of the capabilities of a current-modulated semiconductor laser and beyond the reach of a laser that can be tuned mechanically or thermally. In addition, the photodetector needs to be able to sample the signal in accordance with Shannon's theorem, and therefore in practice to take at least 3 to 4 measurements per period $1/f_R$≈T/N≈0.26 ns (for example for a typical range z=100 m, aiming for a resolution dz=10 cm, and therefore N~1000), i.e. measurements at frequencies higher than tens of GHz, which imposes high demands on the photodetector in terms of rapidity and also in terms of sensitivity.

One solution would be to illuminate the entire scene simultaneously and perform detection in parallel using an array of heterodynes detectors. However, running the above-described LIDAR technique in parallel with external processing is not conceivable because of the enormous data flow rate (data rate=3 $f_R$ $N_x$ $N_y$ Res=(3z/dzT) $N_x$ $N_y$ Res~100 Gbit/s where z=100 m, dz=10 cm, T=20 ms, $N_x$=320, $N_y$=240, Res=8 bits) corresponding to the photocurrent being sampled at full array scale at a rate of several GHz. This is approximately 3000 times higher than the typical data rate encountered with a standard image sensor of the same resolution (data rate=3×50 Hz×$N_x$$N_y$ Res).

It is known practice to perform FMCW-type LIDAR imaging with an optical imaging system, as described in the Aflatouni et al. document entitled *Nanophotonic coherent imager*, Opt. Express 23 (4), 5117-5125 (2015). As illustrated in FIG. 1A, the laser source Las is wavelength modulated by a modulator Mod. The object path illuminates the object that is to be analyzed O, and a lens LO forms the image of the object on a coherent imager IC produced using integrated optics, more specifically on an array of 4×4 optical coupling gratings Res. As illustrated in FIG. 1B, each grating Res sends coupled light to a side coupling photodiode PD situated outside of the image, via a waveguide. The reference path is sent directly to the photodiodes by an optical fiber Fib and by a network of waveguides and Y junctions. The conversion of the photocurrent into voltage is performed by a trans-impedance amplifier TIA for each of the 16 photodiodes. The electronic filtering and the signal processing are performed outside the chip in a detection electronic system SED. The FMCW detection provides access to the range at each point in the image.

However, this coherent LIDAR imager configuration cannot be readily extended to a large number of pixels because 2N waveguides (N for the reference path and N for the object path) would be needed for N pixels, amounting to 2 million waveguides for a 1000×1000 pixels imager, thus posing significant problems of routing and of occupied surface area. In order to artificially increase the number of effective pixels in their imager, the authors resort to the technique of multiple captures with successive mechanical translations of the imager, something which cannot be adapted to moving scenes.

In addition, the architecture proposed is sensitive to the speckles generated by the backscattering of the coherent light by the scene (the image of the object in the plane of the sensor is marred by speckles, i.e. by laser granularity). The beats caused by interference between the reference path and the object path affected by the speckles have the same frequency but are randomly phase-shifted between adjacent speckles. If the pixels are larger than the speckles, the amplitude of the resulting oscillations is attenuated and may become undetectable. Note that, in the configuration proposed by Aflatouni et al., in 2015, because of the indicated size of the diffraction gratings (17×17 µm), and the working wavelength 1.55 µm, an aperture number ($f_\#$) of at least 6 would be required in order to have speckles larger than the pixels. However, optics with a small aperture are not favorable to the detection of objects that are not very reflective or that are situated at significant range and to compensate require the use of a more powerful laser source.

The Krause et al., document entitled *Motion compensated frequency modulated continuous wave 3D coherent imaging lidar with scannerless architecture*, Appl. Opt., 51 (36), 8745-8761 (2012), describes another configuration of an FMCW-type LIDAR imaging system able to obtain a map of an illuminated scene. It is particularly well suited to illuminating the entire scene instantly and contains an array-type detector. However, there is a need to improve the performance of such an imaging system.

SUMMARY OF THE INVENTION

The invention seeks to at least partially overcome at least some of the disadvantages of the prior art and more specifically to propose a coherent LIDA imaging system the performance of which is improved. This performance can be manifested in a better quality of the recombined beam (heterodyne signal) detected by pixels of the detector, for example in terms of the intensity of the heterodyne signal. The imaging system according to the invention comprises an array of pixels at which the scene, illuminated simultaneously, is imaged. Furthermore, each pixel of the detector may comprise an electronic circuit suited to determining the beat frequency of the recombined beam (heterodyne signal) detected.

One subject matter of the invention may be a coherent LIDAR imaging system comprising:
- a laser source configured to emit laser radiation having a time-modulated optical frequency;
- an optical splitter/recombiner comprising at least:
    - an optical splitter designed to spatially split the laser radiation into a beam referred to as reference beam and into a beam referred to as object beam directed toward a scene that is to be observed/illuminated;
    - an optical recombiner designed to spatially superpose the reference beam on an object beam reflected by said scene, referred to as reflected object beam, so as to form a recombined beam;
- an optical imager having an optical axis and creating an image of the scene on a detector by focusing the reflected object beam, said detector comprising an array of a plurality of pixels $P_i$, $i \in [1,n]$, each of the pixels comprising a photodetector designed to detect a portion of the reflected object beam and a portion of the reference beam, the optical splitter/recombiner and the optical imager being configured so that said portions are spatially superposed coherently on the pixel $P_i$, said pixel being able to comprise an electronic processing circuit designed to calculate the beat frequency $F_i$ of the detected portion of the reflected object beam with the detected portion of the reference beam;
- said optical splitter/recombiner being further configured to form a (virtual or real) intermediate image of the reference beam in a plane perpendicular to said optical axis, referred to as intermediate image plane, said intermediate plane being positioned in such a way as to tend toward the generation of flat-tint interference fringes, obtained as a result of interference between said portions, on each illuminated pixel $P_i$,
- a processor connected to the detector and to the laser source and configured to determine a range of points in the scene, imaged on said pixels and to construct a range image of said scene, from the calculate beat frequency associated with each pixel $P_i$ and from the modulated optical frequency of the laser radiation.

According to particular embodiments of the invention:
- the optical splitter/recombiner is configured in such a way that a position of the intermediate image plane on the optical axis of said optical imager is comprised in a segment of the optical axis corresponding to the projection onto the optical axis of a zone of intersection between subbeams of the reflected object beam, said subbeams being full-light edge-of-field beams;
- the optical splitter/recombiner is configured so that the intermediate image plane is coincident with a plane containing a pupil or a diaphragm of said optical imager;
- the optical splitter/recombiner is configured so that a lateral dimension of said intermediate image is less than or equal to a lateral dimension of the intersection of said subbeams in the intermediate image plane;
- the imaging system comprises an optical shaper placed in the path of the laser radiation or of the object beam and configured so that a beam coming from the optical shaper displays uniform illumination of a predetermined zone of the scene that is to be observed;
- a numerical aperture of the optical imager is designed so that a diameter $\phi_g$ of the speckles on the detector is greater than a characteristic dimension $a_{pix}$ of the photodetector of each pixel of the detector;
- the optical splitter/recombiner is configured so that, for each pixel $P_i$, an axis of propagation of said portion of the reflected object beam forms, with an axis of propagation of said portion of the reference beam, an angle $\theta$ such that $\theta < \lambda/(2 \times a_{pix})$, where $a_{pix}$ is a characteristic dimension of the photodetector of each pixel of the detector and $\lambda$ is the wavelength of the laser radiation;
- the laser source is configured so that said optical frequency is modulated by a periodic linear ramp of excursion B and duration T and so that a coherence length of the laser radiation is twice as high as a predetermined maximum distance $z_{max}$ between the scene that is to be observed and the device;
- the calculation of the beat frequency is performed simultaneously for all the pixels of said detector, each pixel $P_i$ comprising a layer referred to as an interconnection layer in a dielectric material transparent to the recombined beam, said layer comprising metallic interconnections connected to the electronic circuit, said interconnection layer being arranged on a side of the photodetector opposite to a side detecting said portion of the reflected object beam and said portion of the reference beam, said electronic circuit associated with the pixel $P_i$ being configured to collect a photocurrent generated in the photodetector representative of said beat and convert it into a voltage, and then to:
substitute a DC component of the signal representative of said beat with a predetermined fixed voltage value, generating an electrical signal referred to as substituted signal; then
amplify said substituted signal, generating an amplified signal;
detect, using a comparator, peaks or rising fronts or falling fronts of the amplified signal,
proceed to count the number of detected periods, and transmit to the processor a signal representative of said count of the number of detected periods,
said processor determining the range of a point in the scene by calculating the number N of periods detected over the duration T of the optical frequency modulation from said signal representative of the count;
a pixel sampling frequency is greater than two times, preferably three times, a frequency $F_{R,max}$ corresponding to the beat frequency associated with an object in the scene which is situated at a maximum predetermined range $z_{max}$, and such that $F_{R,max}=2Bz_{max}/cT$, where c is the speed of light;
the optical splitter comprises an integrated optical circuit, referred to as first integrated optical circuit, in which said laser radiation is coupled, at least one waveguide of said first integrated circuit guiding said reference beam, the first integrated optical circuit further comprising a plurality of waveguides each comprising at least one diffraction grating, referred to as object grating, so as to form the object beam;
the optical recombiner comprises an integrated optical circuit, referred to as second integrated optical circuit, in which said reference beam is coupled by means of an optical element, the second integrated optical circuit comprising at least one waveguide comprising at least one diffraction grating referred to as reference grating, the reference grating coupling the reference beam to free space and to the optical imager, the second integrated optical circuit being positioned in said intermediate image plane so that the reference grating forms the intermediate image;
the optical element is an optical fiber (FO), guiding said reference beam coming from the first integrated optical circuit toward said second integrated optical circuit;
the optical splitter/recombiner comprises an integrated optical circuit in which said laser radiation is coupled, said integrated optical circuit comprising the optical splitter and said optical recombiner,
the optical splitter comprising a plurality of waveguides of the integrated optical circuit and each comprising at least one diffraction grating, referred to as object grating, said object gratings coupling the object beam to free space and to the scene that is to be observed;
at least one waveguide of said integrated circuit referred to as reference waveguide guiding said reference beam toward said optical recombiner comprising at least one diffraction grating, referred to as reference grating, situated on said reference waveguide, the integrated optical circuit being arranged in said intermediate image plane so that the reference grating forms the intermediate image;
the optical splitter/recombiner further comprises an intermediate optical device, positioned after the optical splitter, and before the optical recombiner (SR), the intermediate optical device being designed to focus the reference beam and form said intermediate image.

Another subject matter of the invention is an imaging method using a coherent LIDAR imaging system, comprising the following steps:
emitting laser radiation from a laser source having a time-modulated optical frequency;
spatially separating, using an optical splitter of an optical splitter/recombiner, the laser radiation into a beam referred to as reference beam and into a beam referred to as object beam directed toward a scene that is to be illuminated;
spatially superposing, using an optical recombiner of the optical splitter/recombiner, an object beam reflected by said scene, referred to as reflected object beam, and the reference beam, so as to form a recombined beam (heterodyne signal);
creating, using an optical imager, an image of the scene on a detector by focusing the reflected object beam, said detector comprising an array of a plurality of pixels $P_i$, $i \in [1,n]$;
detecting, on each pixels, a portion of the reflected object beam and a portion of the reference beam which together form a portion of a recombined beam (heterodyne signal) having a beat frequency representative of a range of the illuminated scene;
said optical splitter/recombiner being configured to form an image, referred to as intermediate image, of the reference beam in a plane perpendicular to said optical axis, referred to as intermediate image plane, the position of the intermediate image plane on the optical axis being comprised in a segment along the optical axis corresponding to the projection onto the optical axis of a zone of intersection between subbeams of the reflected object beam, said subbeams being full-light edge-of-field beams;
determining, using a processor connected to the detector and the laser source, a range to points of the scene which are imaged on said pixels and constructing a range image of said scene from the beat frequency associated with each pixel and from the modulated optical frequency of the laser radiation.

BRIEF DESCRIPTION OF THE FIGURES

Further features, details and advantages of the invention will become apparent from reading the description given with reference to the attached drawings provided by way of example and which, respectively, depict:

FIG. 4A: for two opposite end pixels situated at the edge of the array of pixels: the end rays of the reflected object beam and the end rays of a light source equivalent to the reference beam;

FIG. 4B: full-light edge-of-field rays of the reflected object beam, revealing a central zone situated at the aperture diaphragm;

FIG. 4C: for an end pixel situated around the edge of the array of pixels: the end rays of the reflected object beam, and the end rays of a light source equivalent to the reference beam, this source being situated upstream of the aperture diaphragm;

FIG. 4D: the same rays as those illustrated in FIG. 4C, in the case where the equivalent light source is situated in the plane of the aperture diaphragm;

DETAILED DESCRIPTION OF PARTICULAR EMBODIMENTS

In the figures and the remainder of the description, the same references represents elements that are identical or similar. In addition, the various elements are not depicted to scale in order to make the figures clearer. Furthermore, the various embodiments and variants are not exclusive of one another and may be combined with one another. Unless indicated otherwise, the terms "substantially", "approximately" and "of the order of" mean to within 10% and preferably to within 5%. Furthermore, terms "of between . . . and . . . " and equivalents mean that the end points are included, unless indicated otherwise.

Figure 1A:
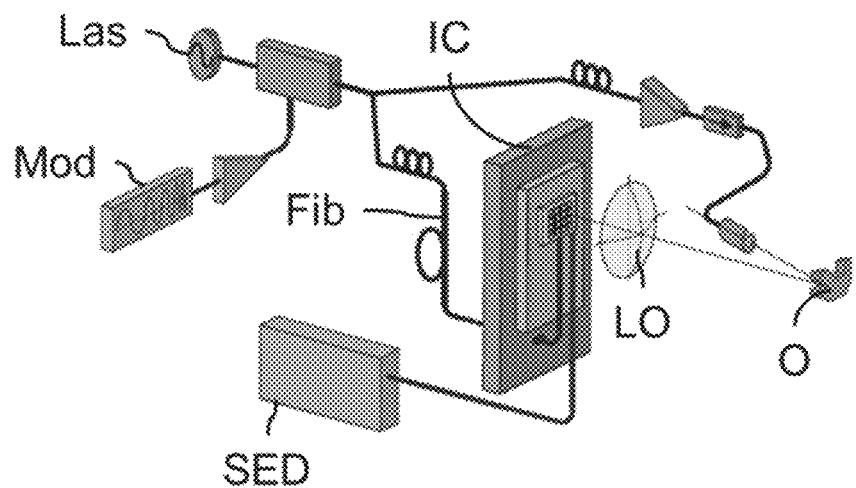
FIGS. 1A and 1B, already described, are schematic views of a LIDAR imaging system of the prior art.
Figure 1B:
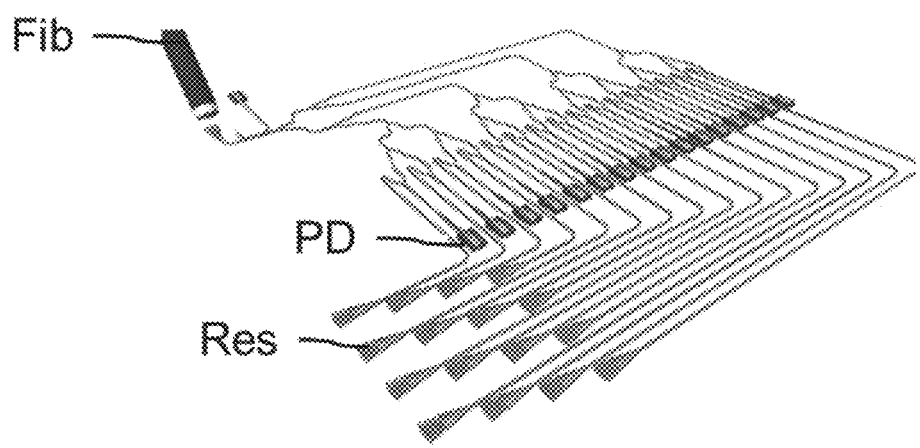
Figure 2:
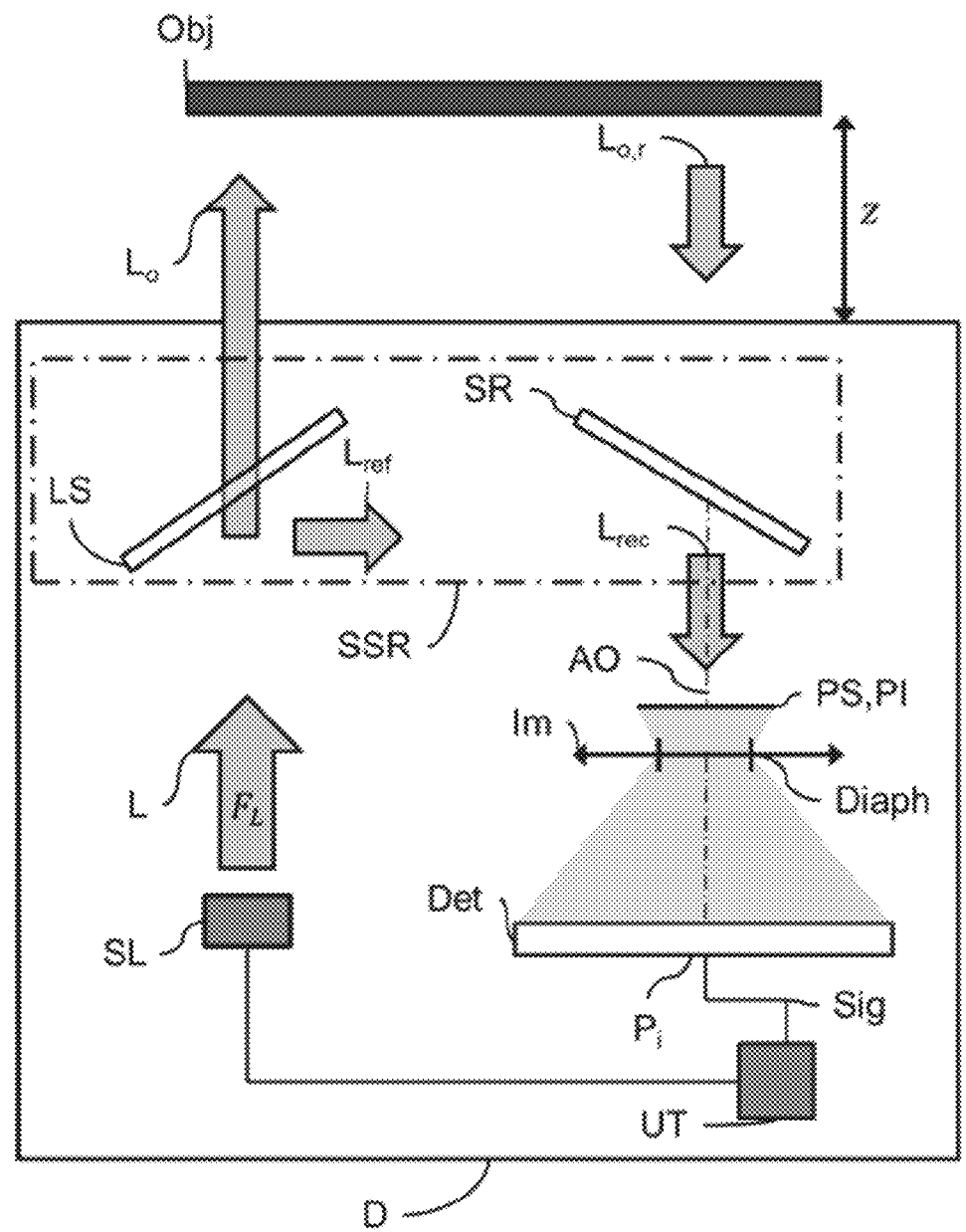
FIG. 2 is a schematic view of an imaging system according to one embodiment of the invention.

FIG. 2 depicts a schematic view of a coherent LIDAR imaging system D according to one embodiment of the invention. The imaging system D can be used to acquire an instantaneous range image of a scene that is to be illuminated/observed Obj by creating interference between an object path (reflected object beam $L_{or}$ reflected by the scene) and a reference path (reference beam $L_{ref}$) on an array of pixels using an optical imager Im creating an image of the scene.

Note that the imaging system D is said to be of the LIDAR (Light Detection and Ranging) type insofar as it is designed to provide a map of the range (or a range image) of a scene illuminated by a coherent optical signal. In the context of the invention, the imaging system illuminates the entire scene instantaneously using a continuous optical signal and simultaneously acquires the image of the illuminated scene in order to determine the range thereof. The imaging system according to the invention thus differs from LIDAR systems (of the time of flight or TOF measurement type or even of the FMCW type) in which the scene is "scanned", i.e. spatially scanned by an optical signal.

Note too that the imaging system D is said to be a heterodyne detection system insofar as, in order to determine the range of the illuminated scene, a frequency referred to as the beat signal of a heterodyne signal (recombined beam) formed by the interference between a reference beam of a local oscillator and a beam backscattered/reflected by the illuminated scene is determined, these two optical beams being coherent with one another. The reference beam and the beam projected onto the scene effectively both come from the same primary optical signal (laser radiation L) emitted by the laser source. The heterodyne detection is of FMCW type insofar as the primary signal is a frequency-modulated continuous signal.

The imager (detector Det) may be of the global shutter type in which all the pixels $P_i$ are read at the same instant. The imaging system is thus able to provide an instantaneous range image. As a variant, it may be of the rolling shutter type and therefore offer sequential reading of the pixels $P_i$, for example row by row, where all the pixels $P_i$ of the one same row are read simultaneously.

The imaging system D comprises a laser source SL configured to emit laser radiation L with a time-modulated optical frequency $F_L$. The laser source is configured so that a coherent length of the source is two times greater, preferably 10 times greater than a predetermined maximum range $z_{max}$ between the most distant object in the scene and the imaging system D. Specifically, as the imaging system D is a coherent LIDAR system, the coherence length $I_C$ of the laser source is greater than the difference in optical pathway between the object path and the reference path—which is approximately the there-and-back distance between the scene that is to be observed Obj and the imaging system D (minus the optical pathway of the reference beam between the splitter blade and the recombiner blade)—in order to perform coherent detection.

The reference path is the pathway followed by the reference beam $L_{ref}$ between the laser source SL and the detector array Det. The object path is the outbound path followed by the object beam $L_o$ from the laser source SL to the scene, plus the return pathway of the reflected/backscattered object beam $L_{or}$ reflected/backscattered by the scene as far as the detector array Det.

The laser radiation L emitted by the laser source SL is a coherent, continuous and frequency-modulated primary signal. It is frequency modulated, for example in this instance linearly, on the basis of a starting frequency $f_o$ over a repetition period T with a bandwidth B. The signal in this instance is a chirp signal, which is to say a sinusoidal wave of which the instantaneous frequency changes linearly with time.

The laser source SL may, in the case of emission in the near infrared domain (between 0.7 and 2 μm) be of the Vertical-Cavity Surface Emitting Laser (VCSEL) type which generally has a coherence length of the order of one meter, or may even be of the Edge Emitting Laser (EEL) type which may have a coherence length of the order of a few tens or hundreds of meters.

Passive optical elements may be situated on the optical pathway of the laser radiation L (primary signal) between the laser source SL and the optical splitter/recombiner SSR. Thus, a shaping lens may be situated at the output of the laser source SL and allows the optical beam to be collimated while broadening its lateral dimension, for example to a diameter of a few millimeters. In addition, a spatial filtering device may be present to eliminate the high spatial frequencies. Thus, the laser radiation L can propagate in a collimated manner, with possibly a gaussian profile and a diameter of the order of a few millimeters, for example 5 mm.

The imaging system D comprises an optical splitter/recombiner SSR comprising at least:

an optical splitter LS designed to spatially split the laser radiation L into two paths: a reference path with which there is associated a reference beam $L_{ref}$ and an object path with which there is associated an object beam $L_o$ directed toward the scene that is to be illuminated Obj;

an optical recombiner SR designed to spatially superpose the reference beam $L_{ref}$ on an object beam reflected by the scene, referred to as reflected object beam $L_{or}$ so as to form a recombined beam $L_{rec}$ (heterodyne signal).

According to one embodiment of the invention, the optical splitter is configured so that the distribution of the intensity of the light radiation of the reference beam $L_{ref}$ and of the object beam $L_o$ are approximately equal to 10%/90% (at the output of the optical splitter LS). Other values for intensity ratio may be selected in order to optimize the photometric performance of the imaging system D, notably depending on the characteristics of the scene (for example Lambertian or specular reflection) and of the imaging system D (for example the splitting and recombining factors of the optical splitter and recombiner).

The imaging system D is thus designed to project part of the laser radiation L toward a scene that is to be illuminated instantaneously. What is meant by "scene" is the scene illuminated by the object beam $L_o$. Thus, the entire scene is illuminated instantaneously by the object beam $L_o$ which therefore has an angular aperture capable of illuminating the entire scene instantaneously. As a preference, the scene is also illuminated uniformly, which is to say that the object beam $L_o$ has an intensity the angular distribution of which is constant.

Thus, with a view to illuminating the scene instantaneously and, in this instance, uniformly, the imaging system D may perform shaping of the object beam $L_o$. To do that, it may comprise at least one optical element designed to make the object beam $L_o$ divergent. The angular aperture of the object beam $L_o$ is such that the entire scene is illuminated uniformly by the object beam $L_o$. It is preferably substantially equal to the field angle of the optical imager Im (for example equal to approximately 20°). In addition, it may comprise at least one optical element designed to render the angular distribution of the intensity constant, in order to obtain a flat intensity profile rather than a gaussian profile. Of course, the various optical elements may be separate or combined.

The imaging system D further comprises an optical imager Im designed to perform the imaging of the scene that is to be observed Obj on a detector Det by focusing the reflected object beam $L_{or}$. The detector Det is positioned approximately in the image focal plane of the optical imager Im. In other words, the scene is illuminated and the received plane of the detector array Det are conjugated, give or take the depth of the field. According to one embodiment, the optical imager Im has a focal length that is much shorter than the typical range between the scene and the detector Det so that the scene can be considered to lie at infinity from the view point of the optical imager Im. The optical imager Im is an objective lens comprising an aperture diaphragm Diaph that defines the physical pupil of the system. As detailed later on, it allows a coherent spatial superposition of the reflected object beam $L_{or}$ with the reference beam $L_{ref}$ (corresponding to the local oscillator) on the detector Det, thus improving the quality of the detected heterodyne signal. Note that the imaging device Im allows the use of a common path in order to create an image of the scene and cause the object path and the reference path to interfere. This allows the imaging system D to be far more compact in comparison with LIDARs of the prior art that employ waveguide recombination.

The optical imager Im has optical elements in free space, and comprises at least one lens and an aperture diaphragm which defines the physical pupil. Note that the aperture diaphragm does not have to be a physical object distinct from a lens, but may be defined by the contour of the lens. The optical imager Im comprises an optical axis AO orthogonal to the received plane of the detector array Det. In this instance it is designed to receive the reflected object beam $L_{or}$ and the reference beam $L_{ref}$ so that these can be transmitted to the detector array Det along the one same optical axis AO thus allowing better superposition of the two optical beams, thus improving the combination of the two optical beams by interference, making it possible to improve the intensity of the heterodyne signal.

Figure 12A:
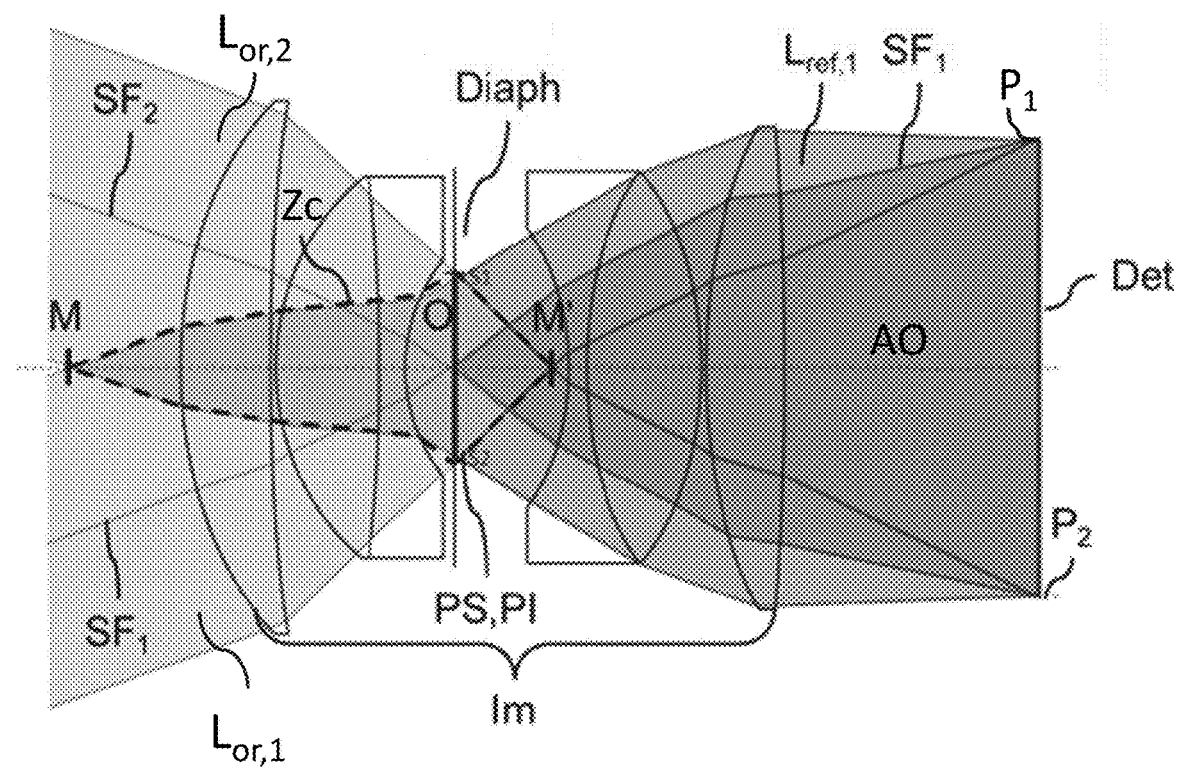
FIGS. 12A and 12B are an illustration of the overlap of the object beam and of the reference beam on the detector, for an optical imager of the "triple Gauss" type for which the intermediate image plane is situated respectively on the aperture diaphragm plane and upstream of the plane of the aperture diaphragm (in this instance before the first lens group of the optical imager of the triple Gauss type)
Figure 12B:
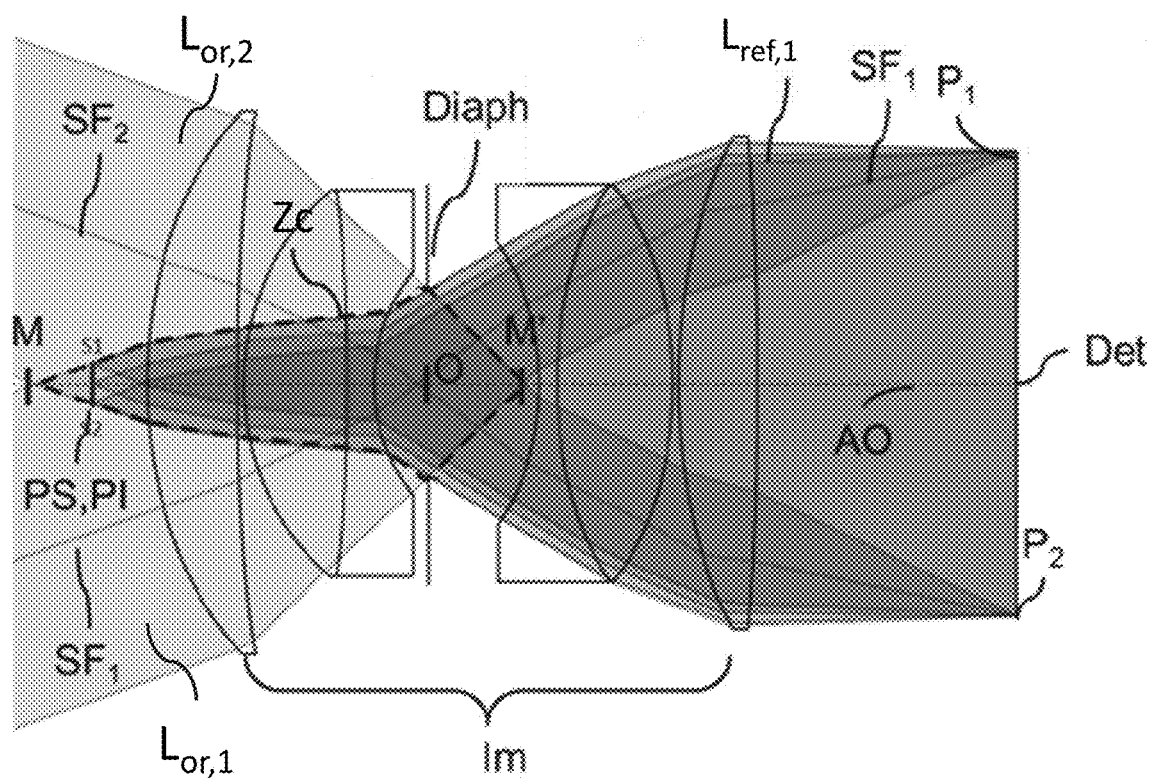

According to one embodiment, the optical imager Im is formed of a lens or a plurality of lenses, for example a triple Gauss (cf. FIGS. 12A and 12B). In instances in which the optical imager Im comprises a plurality of lenses, the reference beam $L_{ref}$ has at least one lens of the optical imager Im in common with the reflected object beam $L_{or}$. In this way, the optical imager Im is able to perform coherent superposition of the reflected object beam $L_{or}$ with the reference beam $L_{ref}$ on the detector Det.

The imaging system D is designed so that all the pixels $P_i$ of the detector array Det receive the reference beam $L_{ref}$. This goes hand in glove with the fact that all the pixels $P_i$ also receive the reflected object signal $L_{or}$. In this way, the recombined beam $L_{rec}$ (heterodyne signal) is formed at each pixel $P_i$ so that a range image can be determined from the entire array of the pixels $P_i$. By way of example, a diffuser and possibly a convergent lens allow the reference beam $L_{ref}$ to be shaped according to a predefined angular aperture. These optical elements are then positioned between the optical device LS and SR. The angular aperture is predefined to take account of the various optical elements of the optical imager Im, so that the reference beam $L_{ref}$ effectively illuminates each pixel $P_i$. Note that the convergent lens between the systems LS and SR, downstream of the diffuser, is not needed: all that is required is for the diffuser to be correctly positioned in the path of the reference beam $L_{ref}$, taking account of its diffusion cone, of the diameter of the reference beam $L_{ref}$ incident on the diffuser, of the aperture of the optical imager Im and of the size of the array of pixels $P_i$ of the detector Det. In a variant (guided optics configuration described later on), diffraction gratings may be dimensioned so that the reference beam $L_{ref}$ has an angular aperture allowing illumination of all the pixels $P_i$.

The diffuser situated between the systems LS and SR and the received plane of the detector array Det are not conjugate, and this then prevents the image of the diffuser from being formed on the detector array Det, as such an image could impair the quality of the heterodyne signal to be detected. By contrast, the diffuser may be conjugate with a plane referred to as intermediate plane situated at or near the aperture diaphragm of the optical imager Im, so as to form a light source equivalent to the reference beam $L_{ref}$ as explained in detail later on.

The detector Det is a detector array. It comprises an array of a plurality of pixels $P_i$, with i ranging from 1 to n. Each of the pixels $P_i$ comprises a photodetector Ph designed to detect a portion $L_{or,i}$ of the reflected object beam $L_{or}$ and a portion $L_{ref,i}$ of the reference beam $L_{ref}$, both focused by the optical imager Im on the pixel $P_i$. The received plane of the detector array Det is situated in a plane conjugate with the scene by the optical imager Im (give or take the depth of field). In other words, the image of the scene is formed in the receiving plane of the detector array Det. Each pixel $P_i$ is intended to receive the reference beam $L_{ref}$ and the reflected object beam $L_{or}$, which interfere with one another to form a signal referred to as a heterodyne signal (recombined beam $L_{rec}$). The detector may be of CMOS or CCD type.

Note that the heterodyne signal comprises a constant component $DC^{het}$ (which is intended to be filtered out) and a periodic alternating component $AC^{het}(t)$ which forms the useful signal. This alternating component has a beat frequency here equal to BT/T and therefore equal to 2 BD/cT, c being the speed of light. In this instance, τ is a delay between the reflected object beam $L_{or}$ and the reference beam $L_{ref}$, B is the passband and T is the period of the frequency modulation of the primary signal (laser radiation L). Determining the beat frequency therefore makes it possible to obtain the range between the scene and the detector array Det.

The pixels $P_i$ may be formed of a microlens positioned facing a photodiode. Each pixel $P_i$ has a lateral dimension $d_{px}$ defined by the size of the microlenses, whereas the photosensitive zone of the photodiodes has a lateral dimension $d_{pd}$. Here, it is considered that the detection plane is the plane in which the microlenses extend.

Each pixel $P_i$ of the detector Det may comprise an electronic processing circuit CE designed to calculate the beat frequency $F_i$ of the heterodyne signal, namely of the recombined beam $L_{rec}$ formed of the interference between the detected portion of the reflected object beam $L_{or,i}$ with the detected portion of the reference beam $L_{ref,i}$. The calculation of the beat frequency is preferably simultaneous for all the pixels $P_i$ of the detector Det (see later). That makes it possible to create an instantaneous range image of the scene ("global shutter") without the need to scan the scene point by point.

For that, each pixel $P_i$ may comprise a photodiode, for example of the pn, pin or avalanche type, and an optical/electrical conversion device to convert the detected heterodyne signal into an electrical signal, for example an electrical voltage. The conversion device may comprise a filter to filter out the continuous component $DC^{het}$ of the detected heterodyne signal and keep only the alternating component $AC^{heL}$; an amplifier of the amplitude of the filtered heterodyne signal, a detector and counter of the periodic variations of the filtered heterodyne signal in order thus to determine a value for the beat frequency of the heterodyne signal. The frequency value determined by each pixel $P_i$ may then be transmitted to a calculation unit which from this deduces a range map. The beat frequency can be determined simultaneously for all the pixels $P_i$ so as to obtain an instantaneous range map (range image) of the scene thus illuminated (this is an approach of the globalshutter type). As indicated above, the imaging system 1 may also be able to operate in rolling shutter mode and thus offer sequential reading of the pixels $P_i$, for example row by row, where all the pixels $P_i$ of the one same row are read simultaneously.

Thus, in operation, the laser source emits the coherent primary signal, which is continuous and frequency modulated (laser radiation L), and of which part (object beam $L_o$) is projected onto the scene to illuminate it instantaneously. Part (reference beam $L_{ref}$) of the primary signal is transmitted to the detector array Det. The optical imager Im receives the reflected object beam $L_{or}$ and forms the image of the illuminated scene on the array of pixels $P_i$. In this instance, it also receives the reference beam $L_{ref}$, which is transmitted toward the array of pixels $P_i$. The reference beam $L_{ref}$ and the reflected object beam $L_{or}$ interfere and form, in each pixel $P_i$, a recombined beam $L_{rec}$, which is to say the heterodyne signal. Each of the pixels $P_i$ advantageously determines the beat frequency $f_R$ of the detected heterodyne signal and the range map of the illuminated scene is thus determined.

Figure 3A:
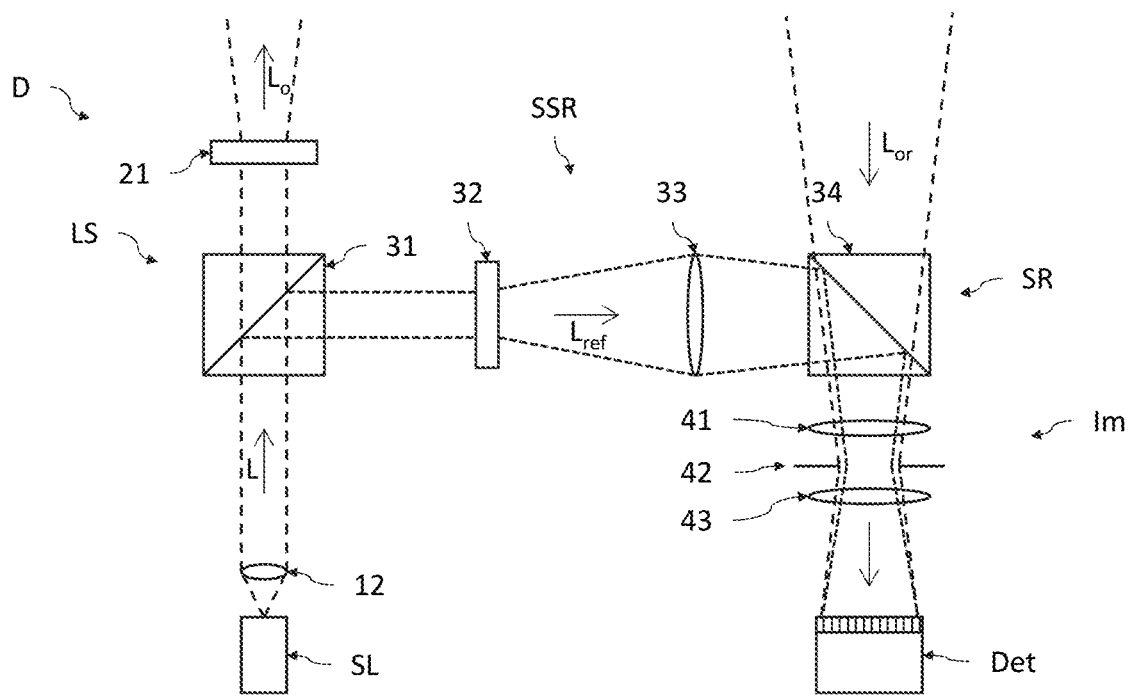
FIGS. 3A and 3B are schematic and partial views of two examples of the imaging system according to one embodiment, making it possible to obtain a range map of the entire illuminated scene, in a free space optic configuration (FIG. 3A) and in a guided optic configuration (FIG. 3B)
Figure 3B:
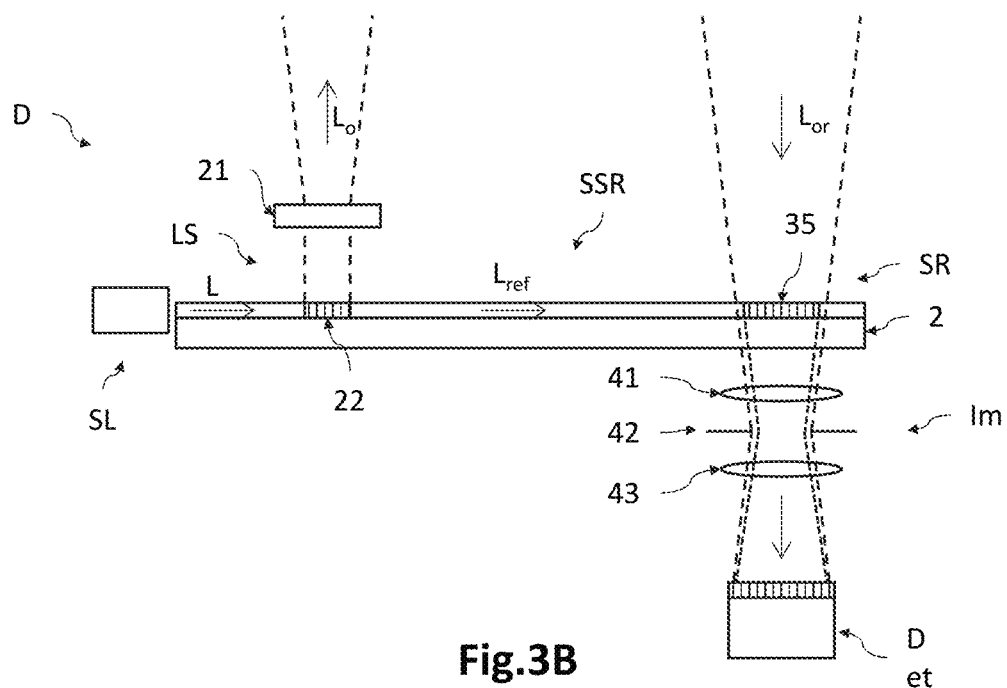

FIGS. 3A and 3B are schematic and partial views of a heterodyne detection LIDAR imaging system D of FMCW type, designed to determine a range image of a scene illuminated instantaneously by a continuous and frequency-modulated optical signal. The imaging system D here has a free space configuration (FIG. 3A) or a guided optics configuration (FIG. 3B). These are merely examples given by way of illustration, it being appreciated that combinations and variants of these configurations are possible.

In the example of FIG. 3A (free space optic), the imaging system D comprises a laser source SL and a shaping lens 12 able to collimate the optical beam while broadening the lateral dimension thereof. The optical splitter LS comprises a semi-reflective blade or a splitter cube, in this instance a splitter cube 31 which transmits part of the primary signal (laser radiation L), which becomes the object beam $L_o$, and reflects part of the primary signal, which becomes the reference beam $L_{ref}$.

An optical element 21, in this instance a transmission diffuser, is here positioned downstream of the splitter cube 31, and is designed to make the object beam $L_o$ divergent. The angular aperture of the object beam $L_o$ is in this instance such that the entire scene is illuminated uniformly by the object beam $L_o$. The intensity profile of the object beam $L_o$ changes from a gaussian profile to a flat profile. In addition, the same diffuser 21 here renders the object beam $L_o$ divergent. A lens (not depicted) may be situated downstream of the diffuser (or upstream thereof) so that the angular aperture has a predefined value, in this instance a value substantially equal to the field angle of the optical imager Im. The optical recombiner SR here comprises a combiner cube 34 providing transmission of the reference beam $L_{ref}$ and of the reflected object beam $L_{or}$ toward the detector Det along the same optical axis. The optical imager Im here comprises a collection of lenses 41, 43 and an aperture diaphragm 42 (which defines the physical pupil) which are designed to create the image of the illuminated scene on the reception plane of the detector Det.

Furthermore, the optical splitter/recombiner SSR here comprises a diffuser 32 and a lens 33 which are situated between the splitter cube 31 and the combiner cube 34. The diffuser 32 is able to make the angular distribution of the intensity constant in order thus to obtain a flat profile for the intensity of the reference beam $L_{ref}$ rather than a gaussian profile. The diffuser 32 and the lens 33 shape the reference beam $L_{ref}$ to a predefined angular aperture, bearing in mind the various optical elements present, so that the reference beam $L_{ref}$ effectively illuminates all the pixels of the detector Det. Such a lens 33 is not indispensable for that. Note too that the diffuser 32 and the detection plane are not conjugate, so that the image of the diffuser 32 is not formed on the detector Det. The optical splitter/recombiner SSR is also configured to form an image, referred to as intermediate image PS, of the reference beam in a plane perpendicular to said optical axis, referred to as intermediate image plane PI. In other words, the diffuser 32 is situated in a plane conjugate with the intermediate image plane PI, to form the intermediate image PS (equivalent light source), which is situated in the segment [MM'] (and therefore in the central zone Zc) described later.

In the example of FIG. 3B (guided optics), the imaging system D comprises the one same functionalized substrate 2. The latter comprises a waveguide coupled to the laser source SL, which extends as far as a first array 22 of diffraction gratings (optical splitter LS). This array 22 projects the object beam $L_o$ toward the scene. The waveguide propagates the reference beam $L_{ref}$ as far as a second array 35 of diffraction gratings (optical recombiner SR) which projects the reference beam $L_{ref}$ toward the detector Det, passing via the optical imager Im. In this instance, the second array 35 and the substrate 2 are transparent to the reflected object beam $L_{or}$, so that it is transmitted and superposed on the reference beam $L_{ref}$. Once again, the optical splitter/recombiner SSR is configured to form the intermediate image PS of the reference beam in an intermediate image plane PI perpendicular to said optical axis. In other words, the second array of gratings 35 is situated in a plane conjugate with the intermediate image plane PI to form the intermediate image PS (equivalent light source) which is situated in the segment [MM'] (and therefore in the central zone Zc). Alternatively, the array of gratings 35 is situated in the intermediate image plane PI and therefore itself forms the intermediate image PS (i.e. the equivalent light source of the reference beam $L_{ref}$).

Furthermore, the inventors have found that the performance of the imaging system D is optimized when the presence of interference fringes produced by the coherent superposition of the reflected object beam $L_{or}$ with the reference beam $L_{ref}$ in each pixel $P_i$ is limited or even avoided. Specifically, such fringes may lead to attenuation of the resultant oscillations of the beating of the heterodyne signal, insofar as the pixels $P_i$ integrate all the contributions indifferently. In order to limit or even avoid the appearance of these fringes, the imaging system D according to the invention is configured so that the wavefronts of the two incident portions $L_{or,i}$ and $L_{ref,i}$ are similar or identical in each of the pixels $P_i$. This then makes it possible to limit the generation of fringes of interference between these two incident optical beams.

Also, according to the invention, the optical splitter/recombiner SSR is configured to form an image, referred to as intermediate image PS, of the reference beam $L_{ref}$ in a plane perpendicular to the optical axis AO, referred to as intermediate image plane PI. In addition, the position of the intermediate image PI on the optical axis AO is comprised in a segment [MM'] of the optical axis corresponding to the projection onto the optical axis of a zone of intersection (referred to as central zone Zc in FIGS. 4A to 4D, 11 and 12A-12B) between subbeams of the reflected object beam $L_{or}$, said subbeams being full-light edge-of-field beams. Forming an image of the reference beam $L_{ref}$ in the intermediate image plane PI amounts to forming an equivalent light source (intermediate image PS) of the reference beam $L_{ref}$. The equivalent light source PS is therefore situated in the segment [MM'] and is advantageously contained in a central zone Zc of the rays of the full-light edge-of-field reflected object beam $L_{or}$.

The equivalent light source PS has, at each point, a reference signal emission angle at least equal to the field angle of the optical imager Im so that each point of the equivalent light source PS (each source point) illuminates all the pixels $P_i$. Moreover, the equivalent light source PS may advantageously have a lateral dimension at least equal to that of the central zone Zc of the rays of the full-light edge-of-field back-scattered object signal.

FIGS. 4A to 4D illustrate one configuration of the imaging system D, in which configuration an equivalent light source PS of the reference beam $L_{ref}$ is formed in an intermediate plane PI situated at or near the aperture diaphragm Diaph. These figures depict the reception plane of the detector array Det, the optical imager Im (lenses 41, 43 and aperture diaphragm Diaph), and the equivalent light source PS of the reference beam $L_{ref}$.

So, the optical splitter/recombiner SSR creates the image of the reference beam $L_{ref}$ in the intermediate plane PI. The diffuser 32 (FIG. 3A) or the array of gratings 35 (FIG. 3B) is therefore situated in a plane conjugate with the intermediate plane PI (or the array of gratings 35 is itself situated in the intermediate plane PI). The longitudinal positioning of the equivalent light source PS along the optical axis AO and the lateral dimension thereof can be determined by the optical properties and dimensions of the diffuser 32 (FIG. 3A) or of the array of gratings 35 (FIG. 3B) and possibly by additional optical shaping elements. The equivalent emission angle can be determined by that of the diffuser 32 (FIG. 3A) or that of the array of gratings (FIG. 3B) (and by any additional optical shaping elements that might be present).

The wavefront of the reference beam $L_{ref}$ incident on each pixel $P_i$ is thus made closer, or even identical, to that of the reflected object beam $L_{or}$ in terms of shape and main direction. The generation of fringes of interference between these two optical beams is thus limited, such interference fringes being liable to lead to degradation of the quality of the detected heterodyne signal. In other words, the array of pixels $P_i$ of the detector Det acts as a field diaphragm.

The field of view (FOV, the angle of the field) of the optical imager Im is defined as being the angle in which the detector array Det is sensitive to the reflected object beam $L_{or}$ reflected through the optical imager Im. It is defined here as being the angle, measured at the center of the exit pupil, between two incident rays of the reflected object beam $L_{or}$ passing through the one same centerpoint of the output pupil and arriving on two end pixels opposite to one another with respect to the optical axis AO. An end pixel is a pixel $P_i$ situated at the edge of the array of pixels. Furthermore, the exit pupil is the image of the aperture diaphragm from lenses situated downstream of the latter. In this instance, the centerpoint is situated in the plane of the aperture diaphragm.

Figure 4A:
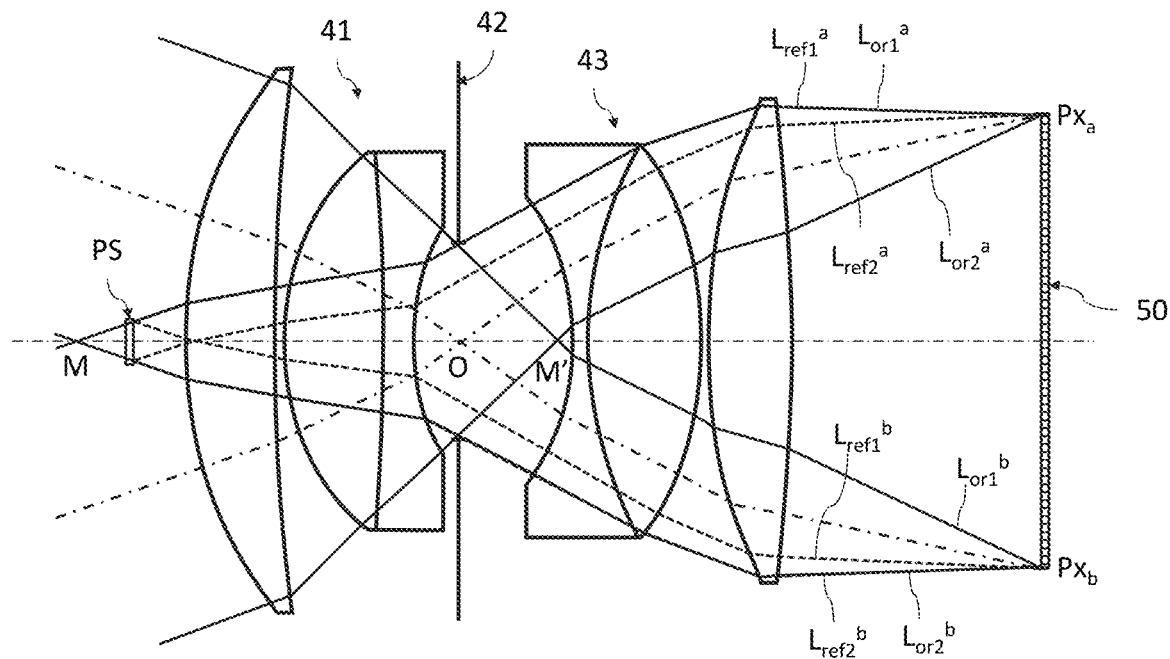
FIGS. 4A to 4D are schematic and partial views of the optical imager and of the array of pixels, illustrating.
Figure 4B:
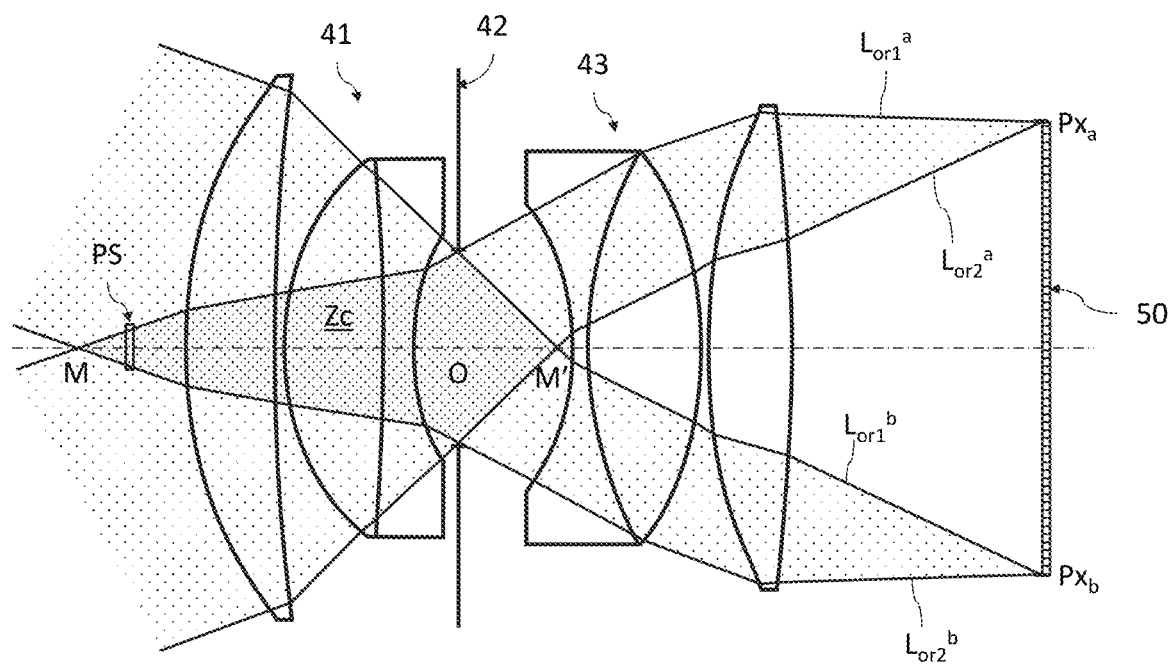

Next, as illustrated more specifically in FIG. 4B, a central zone Zc of intersection of the full-light edge-of-field rays (SF1 and SF2 indicated in FIGS. 11, 12A and 12B) is defined (this field being referred to as an "unvignetted field", according to the term used in the work by J. E. Greivenkamp entitled *Field Guide to Geometrical Optics*, SPIE Press, Bellingham, WA (2004))). It is defined here as being the zone delimited laterally by the intersection of the full-light edge-of-field rays, which is to say of the rays of the reflected object beam $L_{or}$ passing via the contour of the aperture diaphragm Diaph and arriving on the end pixels of the array of pixels. These end pixels are those situated on the edge of the array of pixels, which is to say the pixels furthest from the optical axis AO. The central zone Zc takes the form of two cones sharing the same base delimited by the contour of the aperture diaphragm Diaph. The vertices of the cones are M and M', which are situated in the optical axis AO, respectively upstream and downstream of the aperture diaphragm Diaph. They are the longitudinal end points of the central zone Zc.

FIG. 4A illustrates partially and in detail, in longitudinal section, the optical imager Im and the reception plane according to an embodiment variant in which the equivalent light source PS of the reference beam $L_{ref}$ is situated in the central zone Zc, in this instance upstream of the aperture diaphragm Diaph. The central zone Zc is illustrated more specifically in FIG. 4B.

What is depicted is, for the two end pixels $Px_a$ and $Px_b$, on the one hand, the full-light edge-of-field rays of the reflected object beam $L_{or}$ (in solid line), and, on the other hand, the rays coming from two opposite ends of the equivalent light source PS and received by each of the end pixels (in dotted line).

Thus, as far as the end pixel $Px_a$ is concerned, it here receives the two rays $L_{or1}{}^a$, $L_{or2}{}^a$ of the reflected object beam $L_{or}$ passing through the edge of the aperture diaphragm Diaph (in the longitudinal plane) and the two rays $L_{ref1}{}^a$, $L_{ref2}{}^a$ of the reference beam $L_{ref}$ coming from the edge of the equivalent light source PS (and of course, all the rays $L_{or}$ that fall between the rays $L_{or1}{}^a$, $L_{or2}{}^a$, and all the rays $L_{ref}$ that fall between the rays $L_{ref1}{}^a$, $L_{ref2}{}^a$). The rays $L_{ref1}{}^a$ and $L_{ref1}{}^a$ both pass through the same edge of the aperture diaphragm Diaph and are therefore superposed. Regarding the rays received by the second end pixel $Px_b$, these are not detailed given that their situation is similar.

The optical splitter/recombiner SSR is designed so that the equivalent light source PS has, at each of its points, a divergence (or equivalent emission) cone that covers the entire array of pixels $P_i$. Also, each of the pixels $P_i$ effectively receives the reference beam $L_{ref}$ in addition to the reflected object beam $L_{or}$. The heterodyne signal is therefore indeed formed on each pixel $P_i$.

Because the equivalent light source PS is positioned between the points M and M' and has a lateral dimension at least equal to that of the central zone Zc, the reception cone for the reference beam $L_{ref}$ is substantially identical to the reception cone for the reflected object beam $L_{or}$, and is so at each pixel $P_i$.

FIG. 4B is identical to FIG. 4A except that the rays of the reference beam $L_{ref}{}^a$ and $L_{ref}{}^b$ coming from the equivalent light source PS have not been depicted. What is shown here is the central zone Zc defined laterally and longitudinally by the full-light edge-of-field rays $L_{or1}{}^a$, $L_{or2}{}^a$ and $L_{or1}{}^b$, $L_{or2}{}^b$ (here in a longitudinal plane). The point M upstream of the aperture diaphragm Diaph is situated on the optical axis AO and is at the intersection of the rays $L_{or1}{}^a$ and $L_{or2}{}^b$, whereas the point M' downstream of the aperture diaphragm Diaph is situated on the optical axis AO and is at the intersection of the rays $L_{or2}{}^a$ and $L_{or1}{}^b$. The greatest lateral dimension of the central zone Zc is situated in the plane of the aperture diaphragm Diaph.

Figure 4C:
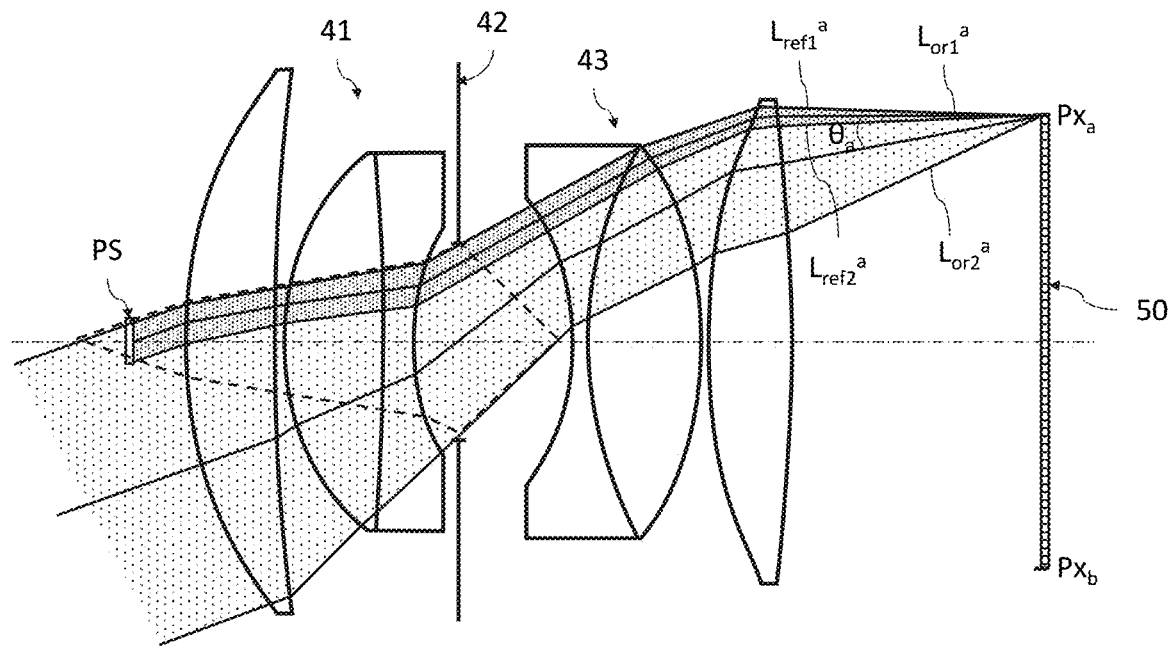

FIG. 4C is identical to FIG. 4A except that it considers only the rays received by the pixel $Px_a$, namely the rays contained between the rays $L_{or1}{}^a$ and $L_{or2}{}^a$ of the reflected object beam $L_{or}$, and the rays falling between the rays $L_{ref1}{}^a$ and $L_{ref2}{}^a$ of the reference beam $L_{ref}$. Each point of this equivalent light source PS illuminates at least the entirety of the reception plane, and in this instance only the reception plane. Thus, the one same pixel $P_i$ receives, in addition to the reflected object beam $L_{or}$, the reference beam $L_{ref}$ coming from all the points of the equivalent light source PS.

It can be seen here that the difference between the wavefronts of these optical beams has been reduced by comparison with the scenario in which the equivalent light source PS is situated outside of the central zone Zc: in particular, the value of the angular deviation $\theta_a$ between the main directions of these wavefronts which are incident on the pixel $Px_a$ has been reduced. A main direction is defined as being the mean direction of the angular cone of the incident beam (reference beam $L_{ref}$ or reflected object beam $L_{or}$) at the pixel $P_i$ concerned, in this instance at the end pixel $Px_a$.

Thus, forming an equivalent light source PS of the reference beam $L_{ref}$ in the central zone Zc makes it possible to reduce the angular deviation $\theta_i$ at the pixel $P_i$ concerned. The dimension of the fringe spacing of the fringes that may form between the reflected object beam $L_{or}$ and the reference beam $L_{ref}$ is thus increased. The dimension of the fringe spacing is, in the first order, of the order of $\lambda/2 \sin \theta_i$, where $\lambda$ is the wavelength of the incident optical signals. Having angular cones for the optical beams (reference beam $L_{ref}$ and reflected object beam $L_{or}$) incident on each pixel $P_i$ which are very similar or even identical to one another also makes it possible to increase the dimension of the fringe spacing.

In other words, it is advantageous, at each pixel $P_i$, for an axis of propagation of the portion $L_{or,i}$ of the reflected object beam $L_{or}$ to be colinear or substantially colinear with an axis of propagation of the portion $L_{ref,i}$ of the reference beam $L_{ref}$. In instances in which the reflected object beam $L_{or}$ and reference beam $L_{ref}$ are approximately flat waves at each pixel $P_i$ and if the directions of propagation of these two waves form an angle $\theta$, the fringe spacing on the sensor thus being $$\frac{\lambda}{2\sin\theta},$$

the condition for having at least one fringe spacing per pixel (flat tint) is expressed as $$\theta < \frac{\lambda}{2a_{pix}}$$

where $a_{pix}$ is the pixel size, for example $\theta<7°$ for $\lambda=1300$ nm and $a_{pix}=5$ μm. As indicated further on, this then tends to yield "flat tint" interference fringes.

The detected intensity of the heterodyne signal is thus improved. Specifically, a significant angular deviation $\theta_i$ between the main directions of the wavefronts and/or a deviation between the angular cones of the incident optical beams lead to a reduction in the size of the fringe spacings, which can then be of the order of size $d_{px}$ of the pixels $P_i$, or even less. Also, during the photodetector acquisition time, the fact that several interference fringes (bright zones and dark zones) are present at the scale of each pixel $P_i$ may manifest itself in a degradation of the quality of the detection of the heterodyne signal.

It is particularly advantageous for the equivalent light source PS to be situated as close as possible to the aperture diaphragm Diaph, and for its width to be at least equal to and preferably substantially equal to that of the central zone Zc, and therefore in this instance to that of the aperture diaphragm Diaph.

Figure 4D:
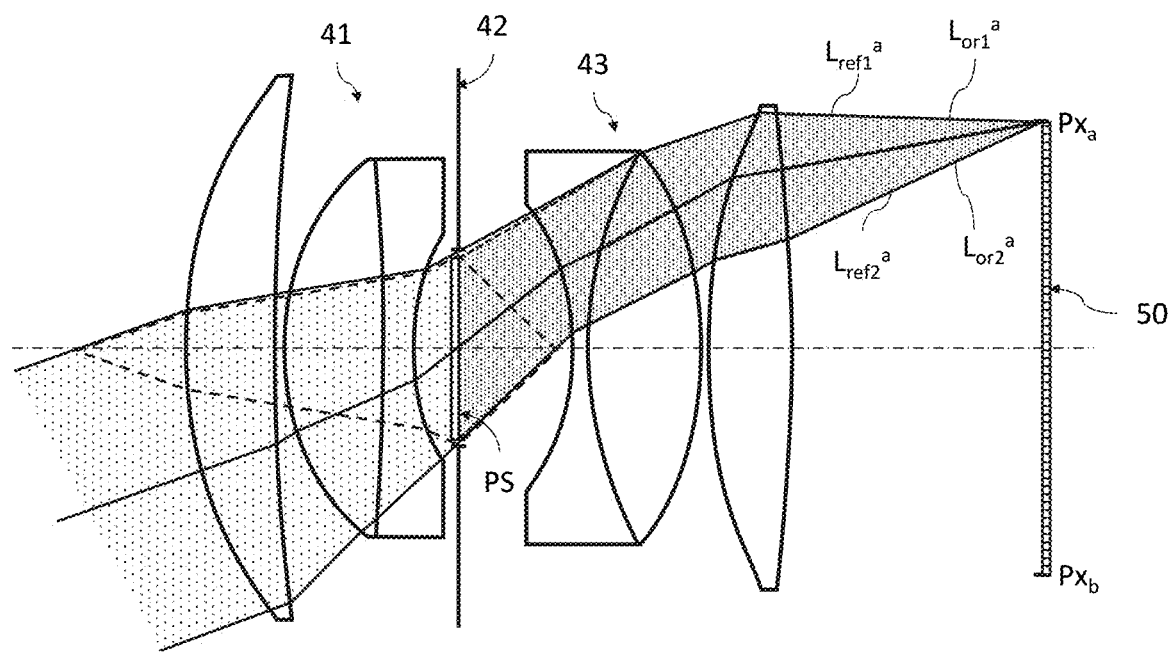

In this respect, FIG. 4D illustrates a variant of the configuration illustrated in FIG. 4C, in which the equivalent light source PS is in this instance situated substantially in the plane of the aperture diaphragm Diaph. It may be noted that, at the level of the pixel $Px_a$, the end rays $L_{or1}{}^a$ and $L_{ref1}{}^a$ are coincident, as are the rays $L_{or2}{}^a$ and $L_{ref2}{}^a$. The same is true of the rays defining the main directions of these signals. The angular deviation $\theta_a$ is therefore substantially zero. In addition, because the equivalent light source PS covers substantially the entire surface area of the aperture diaphragm Diaph, the angular cones of the two optical beams incident on each pixel are substantially equal. Therefore, the wavefronts of the reflected object beam $L_{or}$ and of the reference beam $L_{ref}$ are substantially identical. The fringe spacing therefore has a dimension that may exceed the dimensions of the array of pixels $P_i$, so that it may be considered that there are therefore no fringes of interference between these optical beams that are liable to degrade the quality of the heterodyne signal detected by each pixel $P_i$. These are therefore referred to as being "flat tint" interference fringes. The performance of the imaging device D is therefore further improved.

A processor UT is connected to the detector and to the laser source in order to determine the range of the points in the scene which have been imagined on the pixels and in order to construct an instantaneous range image of the scene. This scene construction is performed using the calculated beat frequency $F_i$ associated with each pixel $P_i$ and from the optical frequency modulation of the laser radiation. What is meant here by range image is a map of the range of the various points in the scene observed each corresponding to a different pixel.

The imaging system D may thus determine an instantaneous (or "global shutter") range image in which all the points in the scene are measured simultaneously with a measurement start and end that are identical for all the pixels (provided that the detector Det permits this). Furthermore, the imaging system D does not require "beam steering" means to scan the scene at a high rate. For operation at video speeds, the measurement duration may extend to 20 ms, which releases constraints both on the speed of the imager and the optical frequency modulation to be provided by the laser source. With all other parameters being equal, at video speed, what is obtained on the object path is the same photon flux on each of the pixels of the FMCW imager as on the photodetector of each pixel of the imaging system D (see FIG. 13 and passages relating thereto) but with the advantage of images that are not deformed in the case of moving scenes.

Thus, the invention proposes an active range imaging system D with high spatial resolution (number of points in the image as given by the number of pixels) which is robust in relation to parasitic ambient light, possibly of the "global shutter" type, and capable of operating at video speeds.

According to an embodiment, the imaging system D comprises a bandpass optical filter positioned in front of the detector or in front of each pixel of the detector intended for detecting range, for example in the case of the acquisition of images of RGB-z type and centered on the emission wavelength of the laser so as to filter out a high proportion of the parasitic ambient light.

The equivalent light source (intermediate image) PS of the reference beam $L_{ref}$ is produced in the intermediate plane PI in a number of different variant ways. In a first variant, the equivalent light source PS is produced using diffraction gratings in an integrated optics circuit contained in the optical recombiner and generating a plurality of "source points" in the intermediate plane PI. In this embodiment, the equivalent light source PS is therefore real. In a second variant, the equivalent light source PS is produced using an intermediate optical device, in free space, creating the intermediate image of the reference beam $L_{ref}$. The equivalent light source PS here is the image of the reference beam $L_{ref}$ focused by an image lens or group of lenses. In this embodiment, the equivalent light source PS is generally virtual.

Figure 5A:
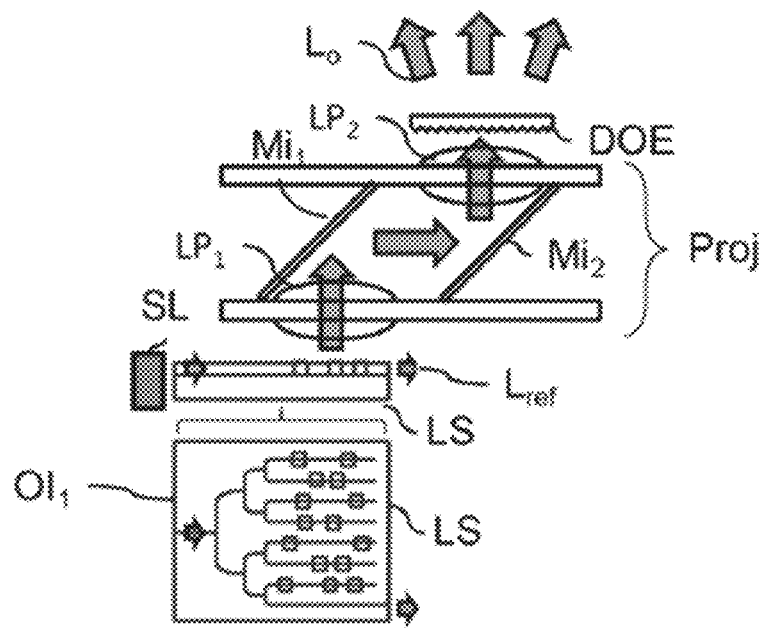
FIGS. 5A and 5B are schematic views, respectively, of an optical splitter and of an optical recombiner according to one embodiment of the invention.

FIG. 5A shows an embodiment of the invention in which the optical splitter LS comprises a first integrated optical circuit $OI_1$ for reducing the vertical size of the device. The laser radiation L is coupled in a waveguide made with a material of index higher than the substrate of the integrated optical circuit. The first integrated optical circuit $OI_1$ comprises a plurality of waveguides each comprising at least one diffraction grating, referred to as object grating, splitting the two, reference/object paths. Specifically, the object gratings are designed to extract vertically (or more generally to extract out of the plane of the circuit OI1) part of the light of the waveguide, forming the object beam $L_o$, the other part continuing to propagate along at least one waveguide and forming the reference beam $L_{ref}$. The use of a plurality of diffraction gratings makes it possible to improve the uniformity or to adjust the wavefront of the object beam $L_o$, while conforming to a condition governing the phase between the various gratings so as to be able to form a coherent superposition of the reference beam $L_{ref}$ and of the reflected object beam $L_{or}$ on the detector Det. However, according to one embodiment, the first integrated optical circuit $OI_1$ comprises a single diffraction grating on a single waveguide.

The projection optical device Proj may be designed to project the light onto the scene that is to be illuminated of which the image is thereafter to be formed on the detector, for example a scene of rectangular shape. As a preference, the projection optical device Proj illuminates the scene in a cone of angular aperture substantially equal to the field of view of the optical imager Im (this being determined by its focal distance and the size of the imager). Thus, whatever the range of the scene, its image corresponds to the size of the imager.

In addition, the projection optical device Proj is preferably designed to illuminate the scene uniformly, in order thereafter to provide uniform illumination and a uniform signal-to-noise ratio on the detector, particularly in instances in which the scene is Lambertian. What is meant here by substantially uniform is that the standard deviation of the light intensity on the scene is, for example, less than 25% of the mean of the light intensity. According to one embodiment, the optical projection device Proj comprises a conventional two-stage optical device made up of a collimating first lens $LP_1$, and of a second lens $LP_2$ which creates the image of the first lens on the scene (for example, the first lens is approximately at the object focal point of the second lens $LP_2$ in order to prevent an image of the source appearing on the scene which is practically at infinity). The laser source SL is the object focal point of the collimating lens $LP_1$. In this embodiment, the set of lenses $LP_1$, $LP_2$ is folded to reduce the vertical size of the optical projection device Proj and therefore comprises two mirrors $Mi_1$, and $Mi_2$ positioned at 45°.

In this embodiment, the imaging system D further comprises an optical shaping device DOE (a Diffractive Optical Element) containing periodic patterns of which the period is of the order of the wavelength of the laser radiation. The optical device DOE is positioned after the optical projection device Proj in order to improve the uniformity of the illumination of the scene. Alternatively, the optical device DOE may be omitted and the shaping of the beam may be performed by the optical projection device Proj. The optical projection device Proj and the optical shaper DOE may be used alone or in combination in all the embodiments of the invention.

Figure 5B:
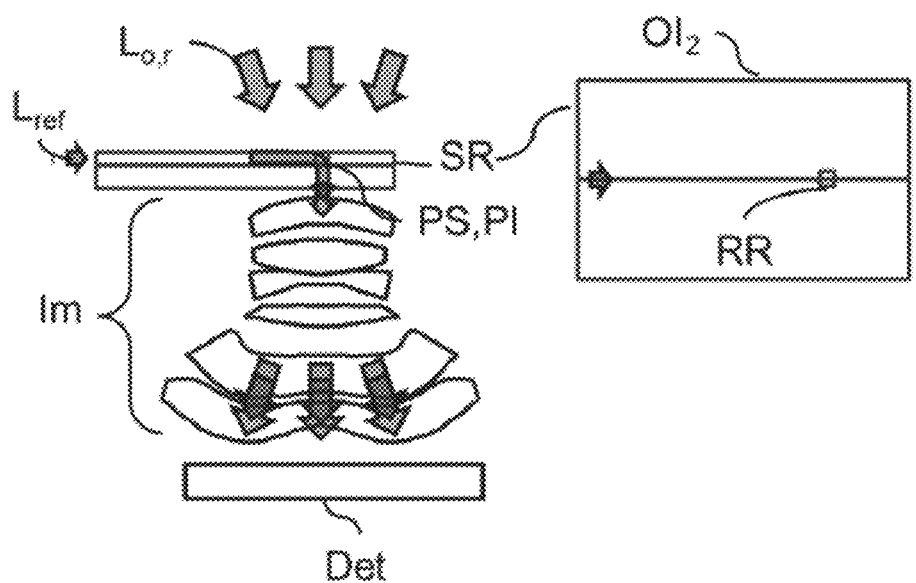

FIG. 5B depicts a schematic view of an optical recombiner SR according to one embodiment of the invention. In this embodiment, the optical recombiner SR comprises an integrated optical circuit $OI_2$, referred to as second integrated optical circuit, so as to reduce the vertical size of the optical device SR. The reference beam $L_{ref}$ is coupled in the second integrated optical circuit $OI_2$ by means of an optical element FO (not depicted). The second integrated optical circuit $OI_2$ comprises at least one waveguide and at least one diffraction grating referred to as reference grating RR allowing the light to be extracted toward the detector Det through at least part of the optical imager Im. The reference grating RR allows the generation of the equivalent of a source point constituting the intermediate image PS on the reference path, in the vicinity of the aperture diaphragm of the optical imager Im. Thus, the second integrated optical circuit $OI_2$ is arranged in said intermediate image plane PI so that the reference grating RR forms the intermediate image PS.

The reference grating RR here is a grating of the High Contrast Grating (HCG) type allowing the decoupling of the light preferably on just one side of the waveguide (in FIG. 5B towards the optical imager Im). The lateral dimensions of the reference grating RR are small (approximately a few wavelengths of the laser radiation L) so as to allow suitable divergence of the reference beam $L_{ref}$ coming from the reference grating RR and broad illumination of the pupil in order to illuminate the entirety of the detector Det. The reflected object beam $L_{or}$ is only very slightly affected by the insertion of the waveguide and of the grating RR in the path of the light. Specifically, the contrast in refractive indices of the gratings and of the waveguides remains small, and the diffraction gratings are not imaged on the detector Det. The waveguide is not situated in a plane conjugate with the detector Det and therefore has no impact on the formation of the image on the detector Det. If it is positioned inside the optical imager Im, the substrate on which the waveguide is produced can be inserted between two lenses of the optical imager Im, when the latter comprises at least two lenses.

According to one embodiment, the waveguide and the grating RR of the second integrated optical circuit $OI_2$ are produced on a surface of the or of one of the lenses of the optical imager Im. The losses through diffraction of the flux are therefore small insofar as the waveguide is small in lateral dimension and is not imaged on the detector Det, and the surface area of the grating RR is small in relation to the surface area of the pupil.

In an embodiment variant, the reference beam $L_{ref}$ is recombined with the reflected object beam $L_{or}$ by a plurality of reference diffraction gratings. There is therefore a relationship concerning the phase of the reference gratings to make them suitable for creating a wavefront on the pixels of the detector Det whereby the tangent at each point makes an angle no greater than $$\frac{\lambda}{2a_{pix}}$$

with respect to the tangent of the wavefront of the reflected object beam $L_{or}$. For that, the guides of the circuit $OI_2$ are advantageously single-mode waveguides. According to one embodiment, the circuit $OI_2$ comprises active or inactive phase shifts in the waveguides or at the exit of the reference grating. Each diffraction grating behaves like a secondary source. The gratings are arranged uniformly to form an array of rows and columns, preferably with the same period. As a preference, the light diffracted by the collection of gratings forms light patterns uniformly spaced in the plane of the detector Det, with one pattern per pixel. The advantage of having a plurality of reference gratings is the ability to better distribute the lighting patterns, better control the uniformity of the illumination of the detector by the secondary source points and of better adjusting the wavefront of the reference beam $L_{ref}$ with respect to the wavefront of the reflected object beam $L_{or}$ on the detector Det.

Alternatively, according to another embodiment, the guided reference beam $L_{ref}$ is decoupled in the direction of free space toward the optical imager Im using a semireflective blade comprised in the waveguide and oriented in this instance at 45° to the axis of propagation in the waveguide. The advantage of the grating embodiment is that it reduces flux losses on the reference path by comparison with the semireflective blade embodiment.

In this example, the optical recombiner SR makes it possible to reduce the total thickness of the imaging system D because a bulky microoptics component (for example a semireflective blade of which the vertical size is approximately equal to the diameter of the entry pupil of the optical imager Im) is replaced with a simple substrate of thickness close to or less than one millimeter.

Figure 6:
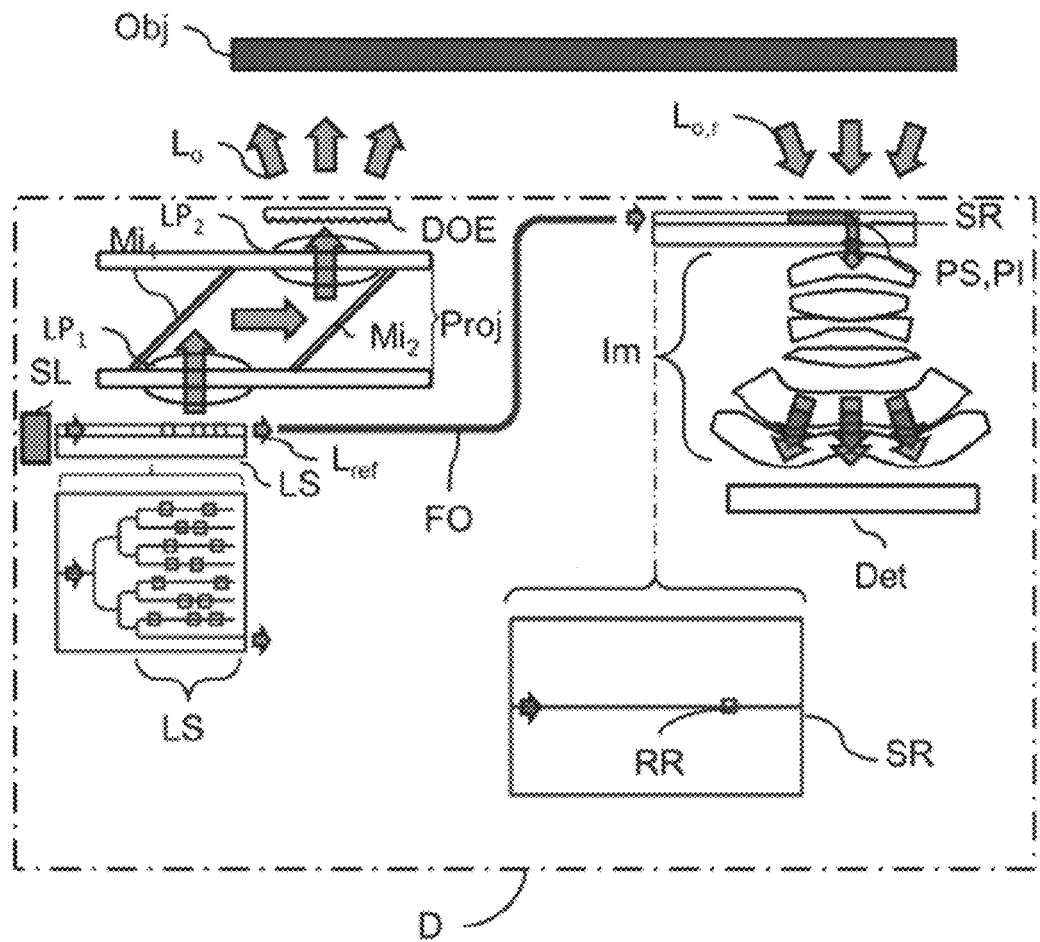
FIG. 6 is a schematic view of an imaging system according to a first embodiment of the invention.

FIG. 6 illustrates a schematic view of an imaging system D according to a first embodiment of the invention. This embodiment combines the optical splitter LS of FIG. 5A and the optical recombiner SR of FIG. 5B. An optical fiber FO is designed to guide the reference beam $L_{ref}$ from the first integrated optical circuit $OI_1$ toward the second integrated optical circuit $OI_2$. The use of the two integrated optical circuits $OI_1$, $OI_2$ makes it possible to reduce the vertical size of the imaging system D. In addition, the imaging system D here comprises the optical projection device Proj and the optical shaper DOE so as to obtain uniform illumination of the scene. In another embodiment, the second integrated optical circuit $OI_2$ comprises a plurality of reference gratings.

Figure 7:
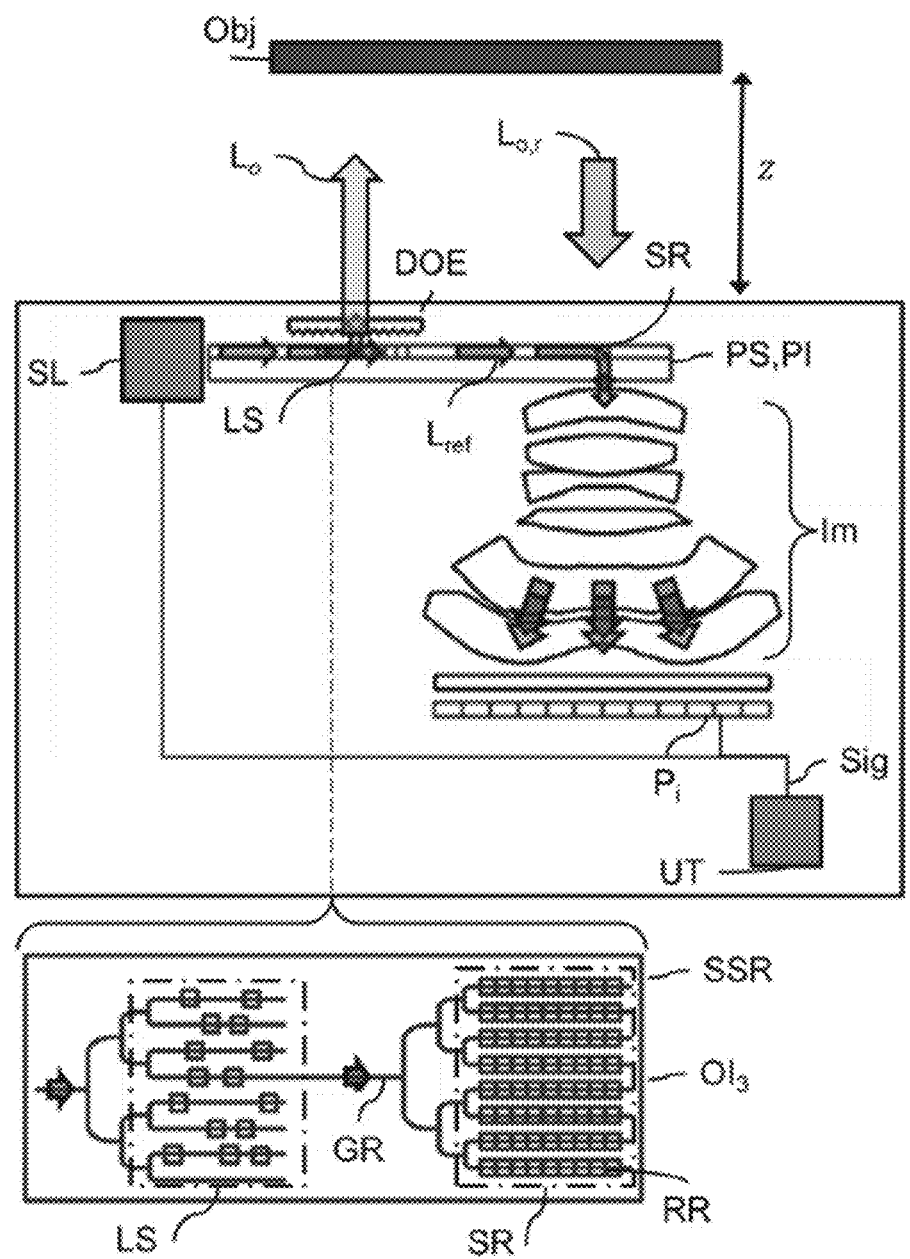
FIG. 7 is a schematic view of an imaging system according to a second embodiment of the invention.

FIG. 7 shows an imaging system D according to a second embodiment of the invention. This second embodiment is similar to that of FIG. 6 except that the first integrated optical circuit $OI_1$ and the second integrated optical circuit $OI_2$ now form just a single integrated optical circuit $OI_3$ which therefore comprises the optical splitter LS and said optical recombiner SR. In this embodiment, the optical splitter/recombiner therefore comprises the integrated optical circuit $OI_3$ in which the laser radiation L is coupled. At least one waveguide of the integrated circuit, referred to as the reference waveguide GR, guides the reference beam $L_{ref}$ toward the optical recombiner SR comprising at least one reference grating RR situated on the reference waveguide. The integrated optical circuit $OI_3$ is arranged in said intermediate image plane so that the reference grating forms the intermediate image PS. The optical recombiner SR here comprises a plurality of reference gratings. Alternatively, according to another embodiment, the optical recombiner SR comprises a single reference grating.

This embodiment has the advantage of avoiding the flux losses brought about by the coupling/decoupling of the reference beam $L_{ref}$ in the optical fiber FO of the imaging system D of FIG. 6. In addition, this arrangement makes it possible to reduce the complexity and the size of the system.

In the embodiments of FIGS. 5B, 6 and 7, the reference grating or gratings RR are configured so that the divergence of the source points is equal or substantially equal to the angle between the subbeams SF1, SF2 (cf. FIG. 11) of the full-light edge-of-field reflected object beam $L_{or}$ of the optical imager Im in the space in which the plane of the source points is situated, which is to say in the intermediate plane PI. This condition makes it possible to optimize the photometry of the system.

Figure 8:
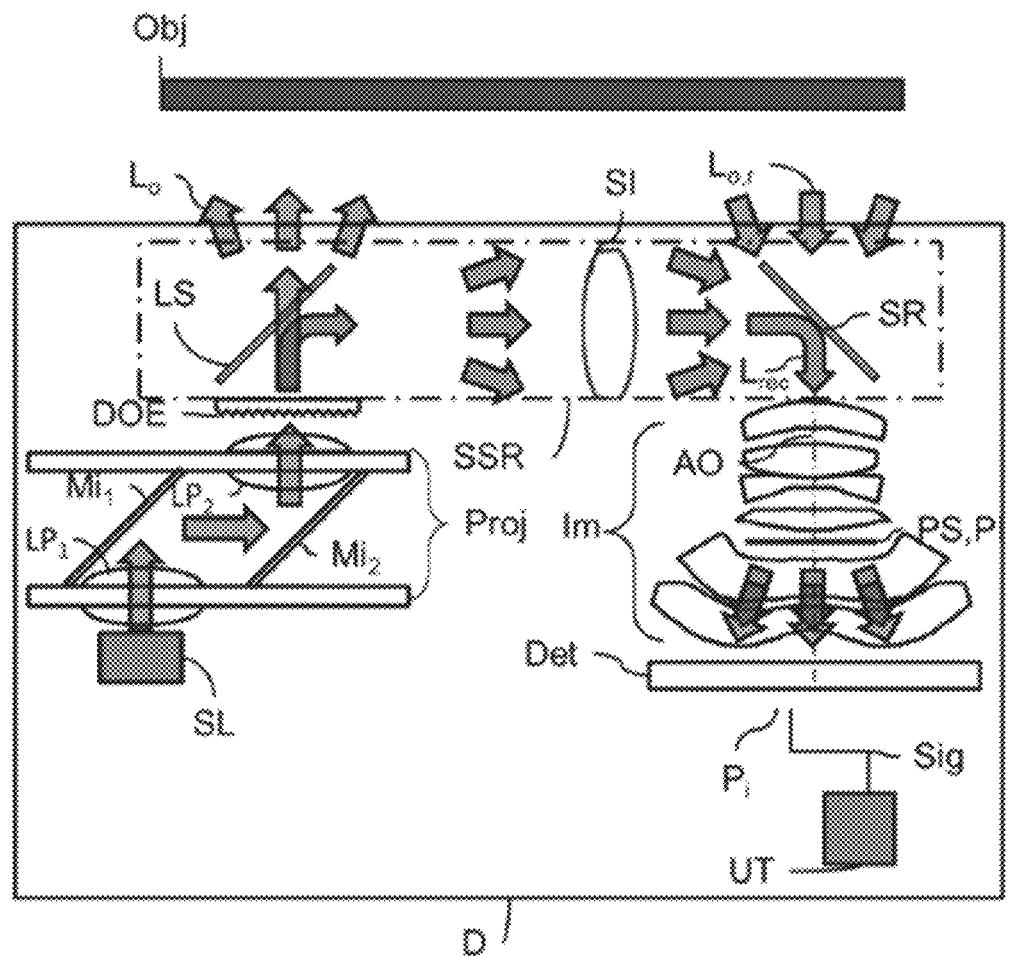
FIG. 8 is a schematic view of an imaging system according to a first embodiment variant of the invention.

FIG. 8 shows a schematic view of an imaging system D according to the second embodiment variant of the invention. In this second variant, the optical splitter/recombiner SSR further comprises an intermediate optical device SI positioned after the optical splitter LS and before the optical recombiner SR. This intermediate optical device SI is designed to focus the reference beam $L_{ref}$ and to form the intermediate image PS (equivalent light source) in the intermediate plane PI. According to one embodiment, this intermediate optical device SI is a lens or a collection of lenses. More specifically, the intermediate optical device SI allows the shaping of the reference beam $L_{ref}$ causing it to converge toward the optical imager Im so that the reference beam $L_{ref}$ illuminates the entirety of the detector Det and so that the wavefronts of the reflected object beam $L_{or}$ and reference beam $L_{ref}$ at each pixel are similar if not to say identical. Also, in this embodiment, the optical splitter LS and the optical recombiner SR may be a splitter cube or a splitter blade. Furthermore, an assembly similar to that of the embodiment of FIG. 5A, formed of a projection optical device Proj and of an optical shaper element DOE, allows the scene to be illuminated substantially uniformly.

Alternatively, according to another embodiment of this second variant, the assembly formed by the optical projection device Proj and the optical shaping element DOE is positioned downstream of the optical splitter LS on the path of the object beam $L_o$.

Figure 9:
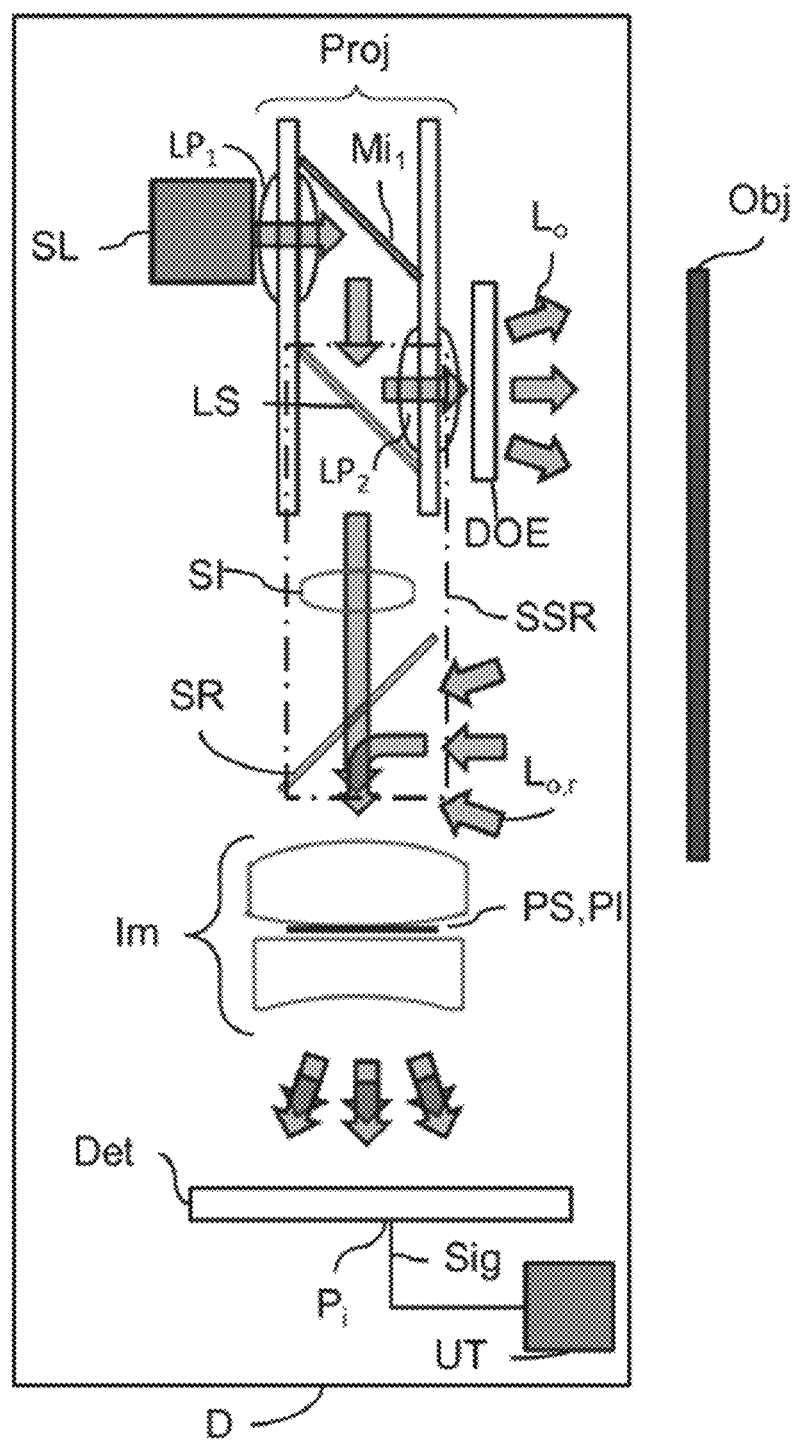
FIG. 9 is a schematic view of an imaging system according to a second embodiment variant of the invention.

FIG. 9 illustrates a schematic view of an imaging system D according to another embodiment of this second variant of the invention. This embodiment is identical to that of FIG. 8 except that the optical imager Im here is vertical and the detector Det is horizontal, in order to save on horizontal space as far as the entire imaging system D is concerned. This notably allows the optical recombiner SR to be positioned between the optical projection device Proj and the optical imager Im. In addition, the optical splitter LS here can be a splitter blade replacing the second mirror $Mi_2$ here oriented at 45°, thereby avoiding the need to position this above the optical projection device Proj.

Alternatively, according to another embodiment, the laser source SL is configured to emit vertically, in order to save even more horizontal space. The first mirror $Mi_1$ of the folded optical projection device Proj is therefore omitted and the laser source SL emits the laser radiation vertically toward the optical splitter LS through the collimating lens $LP_1$. This embodiment is compatible with a longer focal length because the thickness of the optical imager Im is not limited by the width of the imaging system D. Thus, the angular resolution is greater, giving access to even more details in the image (although with a more limited field of view).

The imaging system D uses the FMCW technique and the laser source therefore operates in continuous wave emission. The laser source SL here can be configured so that the optical frequency is modulated by a periodically linear ramp of excursion B and duration T. In this embodiment, the detector is an array of pixels specializing in FMCW heterodyne detection with photodetection and signal processing integrated into each pixel, providing the beat frequency at the end of the frame time (20 ms in the case of a video speed frame time).

Figure 10:
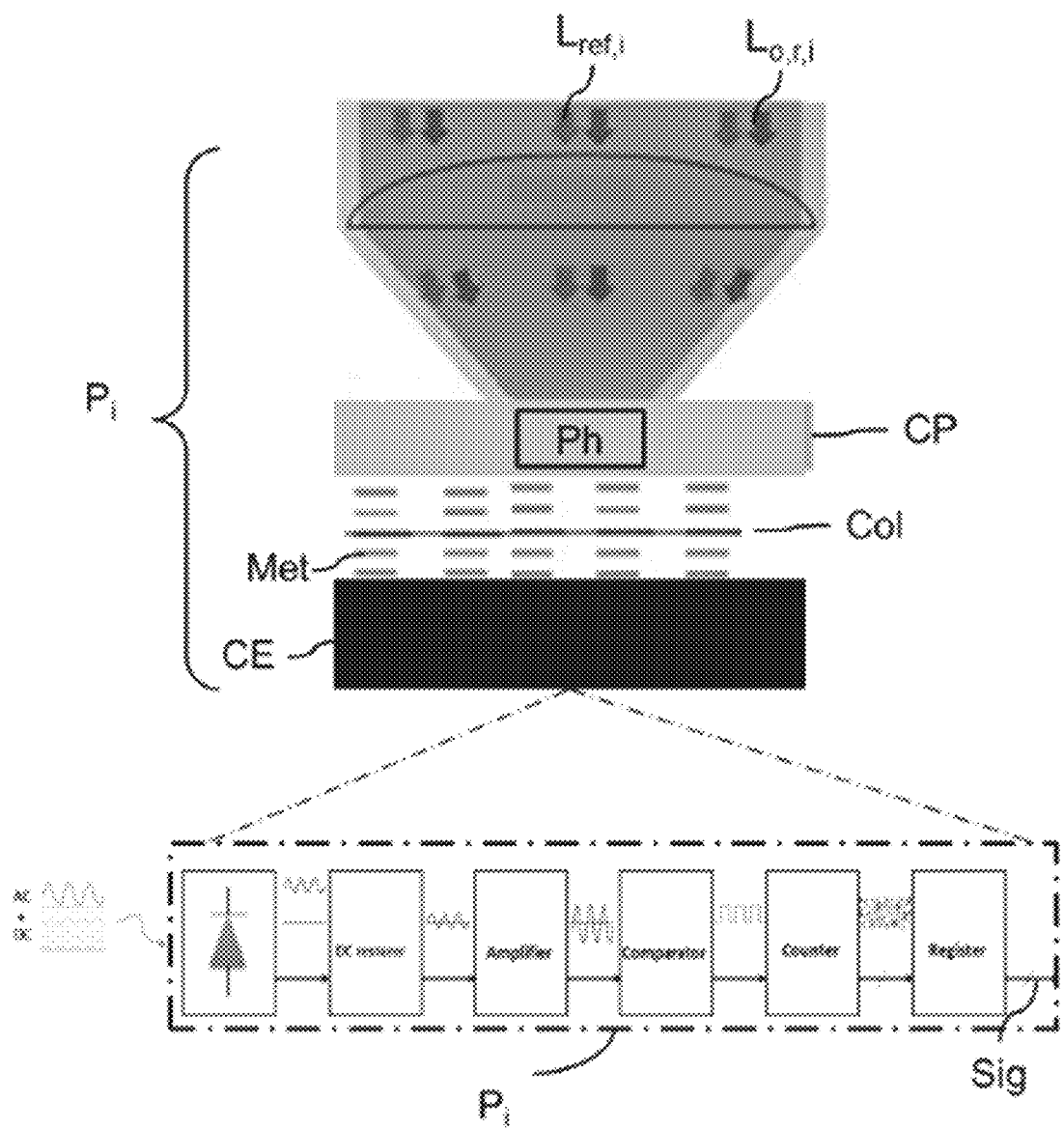
FIG. 10 is a schematic view of a pixel of the imaging system according to one embodiment of the invention.

As illustrated in FIG. 10, each pixel advantageously comprises, underneath a photodetecting layer CP comprising the photodetector Ph, a layer referred to as an interconnection layer BE made from a dielectric material transparent to the recombined beam. The interconnection layer BE comprises metallic interconnections Met connected to the electronic circuit CE and to the processor UT.

The interconnection layer BE is positioned on one side of the photodetector Ph which is the opposite side to a side detecting said portion $L_{or,i}$ of the reflected object beam $L_{or}$ and the portion $L_{ref,i}$ of the reference beam $L_{ref}$ (BSI, or back-side illumination, configuration). The electronic circuit associated with the pixel $P_i$ is configured to collect the photoelectron signal generated in the photodetector Ph and indicative of the beating, and convert it into a voltage and then to:
- substitute a DC component of the heterodyne signal representative of the beat frequency with a predetermined fixed voltage value (and the mean value of the dark current), and generate an electrical signal referred to as substituted signal; then
- amplify said substituted signal, thus generating an amplified signal;
- detect, using a comparator, peaks or rising fronts or falling fronts of the amplified signal;
- proceed to count Sig the number N of detected periods $T_e$ in the amplified signal.

Various peak detection techniques can be implemented such as, for example, for example making a comparison against a predetermined level or comparing a sample against its two closest neighbors, this method being more robust toward low frequency noise.

The metallic interconnections transmit to the processor a signal representative of the count of the number of periods detected. The processor is therefore configured to determine the range z of a point in the scene, which point is associated with the pixel $P_i$, by calculating the number N of periods $T_e$ detected during the duration T of the modulation of the optical frequency on the basis of the signal indicative of the count. Specifically, as explained previously, for a linear ramp, the frequency of the oscillations is $$f_R = \frac{2Bz}{cT}.$$

The number N (N≈T$f_R$, where $f_R$=1/$T_e$) of periods measured during the duration T makes it possible to calculate the range of a point in the scene z=Nc/2B. The resolution in terms of range is $$\delta z \approx \frac{c}{2B}.$$

The pixel $P_i$ thus detects the sinusoidal heterodyne signal indicative of the beating of which the duration is the frame time of the sinusoid of highest frequency $F_{R,max}$ corresponding to the frequency of the beating associated with an object in the scene situated at the maximum predetermined range $z_{max}$, such that: $F_{R,max}$=2$Bz_{max}$/cT where c is the speed of light in a vacuum.

In order to avoid undersampling, according to Shannon's theorem, the sampling frequency for the pixel $P_i$ is greater than two times, preferably three times the frequency $F_{R,max}$. The optical coupling in the photodetector present in each pixel $P_i$ is essentially vertical, which means to say that the light from the reference and object paths propagates in the thickness of the photodetective layer CP.

The streams of data exiting the detector Det may be similar to that of a standard image sensor operating at video speeds, the illumination information being replaced by the frequency information.

According to one embodiment, the light incident on the pixel $P_i$ is focused on the photodetector by a microlens ML if the fill factor of the pixel $P_i$ is less than 1. Such a factor may be desirable in order to avoid crosstalk (spreading of the light) between adjacent pixels of the detector Det. In that case, elements are arranged in the photodetective layer CP, between each pixel $P_i$, in order to individualize zones in the photodetective layer. The microlenses may be contiguous, attached to a surface of the array of pixels and designed to optimize a collection of the reflected object beam $L_{or}$ and of the reference beam $L_{ref}$ on the pixels.

According to one embodiment, the laser source SL is an edge emitting laser (EEL) or a vertical-cavity surface-emitting laser (VCSEL) and the photodetector is a photodiode or an avalanche photodiode. Alternatively, in another embodiment, the laser source is a quantum cascade laser (QCL) and the photodetector is a bolometer array or an infrared photodetector of the mercury cadmium telluride (MCT) type. EEL or VCSEL lasers are preferably used for laser emission at wavelengths shorter than 3 μm, and QCLs are preferably used for laser emission at wavelengths greater than 3 μm.

The table which follows indicates, nonlimitingly, various technologies suitable for the creation of the imaging system D of the various embodiments of the invention:

| Wavelength | 850 nm, 940 nm | 1.3-1.55 μm | 3-5 μm | 8-14 μm |
|---|---|---|---|---|
| Laser source SL | AsGa EEL | InP EEL | QCL | QCL |
| Free space optics | Glass/plastic | Glass | Ge or Si | Ge or Si |
| Integrated optics | SiN or glass | Si or $SiO_2$ | Si or $SiO_2$ | Ge or Si |
| Optical filter | aSi/$SiO_2$ bandpass | aSi/$SiO_2$ bandpass | aSi/$SiO_2$ bandpass | aSi/$SiO_2$ bandpass |
| Photodetector Ph | Si photodiode | InGaAs or Ge photodiode | Cooled MCT or avalanche photodiode | Micro-bolometer |

What is known by free space optics is the propagation of an optical beam through splitter cubes and blades and lenses. What is meant by integrated optics is the propagation of an optical beam through waveguides and diffraction gratings of integrated optical circuits.

Figure 11:
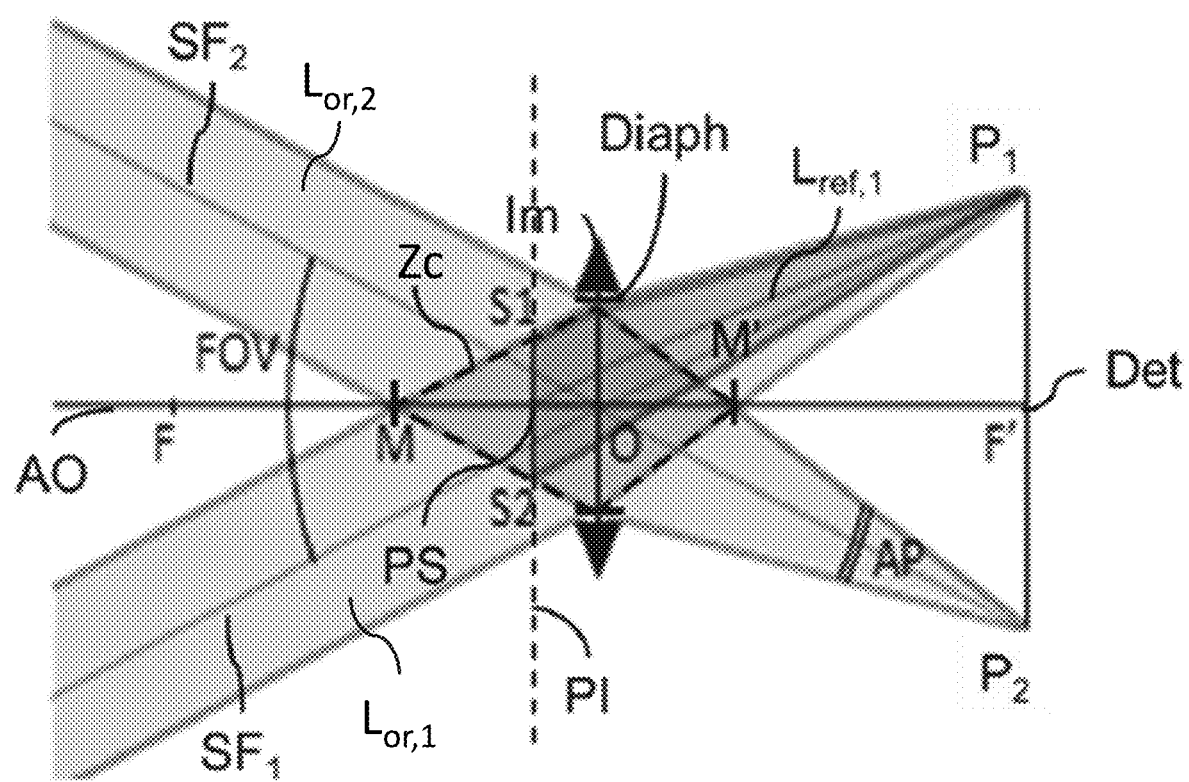
FIG. 11 is an illustration of the overlap between the object beam and the reference beam on the pixels of the detector.

FIG. 11 provides an illustration of the overlapping of the reflected object beam $L_{or}$ by the reference beam $L_{ref}$ on the detector Det in one embodiment of the imaging system D. For the sake of clarity, the optical imager Im is a thin lens, with an aperture diaphragm Diaph situated on this lens. This figure is similar to FIG. 4B.

Consider two pixels $P_1$ and $P_2$ on the detector Det at the edge of the field. These are end pixels, insofar as they are situated at the edge of the array of pixels. The sub-beams $SF_1$ and $SF_2$ are defined as being the edge-of-field beams of the reflected object beam $L_{or}$ respectively illuminating the pixel $P_1$ and the pixel $P_2$ of the detector. The optical splitter/recombiner SSR is configured so that the longitudinal position (which is to say the position of the intermediate image plane PI) and lateral position of the intermediate image PS with respect to the optical axis cause the direction of the rays of the reference beam $L_{ref}$ to tend as far as possible toward that of the rays of the reflected object beam $L_{or}$.

The subbeam $SF_1$ (also referred to as $L_{or,1}$) is the portion of the reflected object beam $L_{or}$ that illuminates the pixel P1. This is a subbeam that is parallel and inclined with respect to the optical axis, coming from a source point of the scene considered to be situated for example at infinity from the point of view of the imaging optical device Im.

The subbeam $L_{ref,1}$ is the portion of the reference beam $L_{ref}$ that reaches the pixel $P_1$ concerned. Each ray of this subbeam comes from a different source point. In the object space of the imaging optical device Im, these rays are parallel to the inclined subbeam of the reflected object beam $L_{or}$ because they pass through the same optical imager Im.

Also, the longitudinal position of the intermediate image PS on the optical axis AO is therefore comprised in the segment [MM']. The segment [MM'] was defined above in connection with FIGS. 4A to 4D. The reference beam $L_{ref}$ coming from the optical splitter/recombiner SSR has at least one lens of the optical imager Im in common with the reflected object beam $L_{or}$ so that these two beams can be superposed on the detector Det. More specifically, the segment [MM'] corresponds to the projection onto the optical axis of the central zone Zc of the two subbeams $SF_1$, $SF_2$ of the full-light edge-of-field reflected object beam. Here, the intermediate image plane PI is situated upstream of the aperture diaphragm Diaph of the optical imager Im.

Source points of the intermediate image PS (equivalent light source) placed in the intermediate plane PI but beyond, on either side of the segment [S1S2] would only partially illuminate the detector Det. Likewise, source points of an intermediate image situated too far upstream of the point M on the optical axis AO would illuminate the detector Det only partially.

The lateral dimension of the intermediate image PS from the point of view of the photometry (to limit losses on the reference path) is advantageously less than or equal to the lateral dimension of the intersection of the subbeams $SF_1$, $SF_2$ at the intermediate image plane PI. An advantageous dimension is represented by the segment [S1S2].

The overlapping of the angular spectra of the reflected object beam $L_{or}$ and of the reference beam $L_{ref}$ on a given pixel is greater if the aperture AP of the optical imager Im is small with respect to its field of view FOV on the reflected object path, this field of view angle being equal to the divergence of the reflected object beam $L_{or}$. These two angular spectra are centered for the pixel of the detector Det situated on the optical axis AO.

If the intermediate image plane PI is situated in the plane of the thin lens with a diameter equal to the pupil, the wavefronts of the reflected object beam $L_{or}$ and the reference beam $L_{ref}$ are coincident. As indicated above, the quality of the detected heterodyne signal is thus greatly improved.

According to one embodiment of the invention, the optical splitter/recombiner SSR is configured so that a divergence of the reference beam $L_{ref}$ coming from the optical splitter/recombiner SSR is equal to the angle formed by said subbeams $SF_1$, $SF_2$ at the intermediate image plane PI. Thus, the reference beam $L_{ref}$ coming from the optical splitter/recombiner SSR illuminates the entirety of the pixels of the detector Det. The optical recombiner SR is configured so that the reference grating or gratings form source points with a divergence equal to the field of view of the reflected object beam $L_{or}$ at the intermediate image plane PI.

According to the invention, the optical splitter/recombiner SSR is configured so that the intermediate image plane PI is situated near to or coincident with a plane comprising a pupil or an aperture diaphragm Diaph of the optical imaging device Im, so as to improve the uniformity of the illumination on the detector, and also improve the quality of the detected heterodyne signal.

According to one embodiment, the intermediate plane PI is coincident with a plane containing a pupil or aperture diaphragm Diaph of the optical imager Im. This embodiment makes it possible to minimize the mean angle of the wavefront of the reflected object beam $L_{or}$ and that of the wavefront of the reference beam $L_{ref}$ on each pixel. Thus, the angular deviation between the reflected object beam $L_{or}$ and the reference beam $L_{ref}$ on each pixel is low enough to generate flat-tint fringes. What is meant here by "flat tint" is that there is no visible fringe on the pixels. In other words, the fringe spacing is large in comparison with the size of the pixels (in this instance the size of the microlenses).

The intermediate image plane PI may, however, be situated upstream of the optical imager Im and the pupil thereof. This position gives greater accessibility to the intermediate image PI and this may be advantageous in the case of an imaging system D in guided optics configuration (cf. FIGS. 5B, 6 and 7).

The intermediate image plane PI may also be situated downstream of the pupil of the optical imager Im, while at the same time keeping at least one lens of the optical imager Im that is common to the reflected object beam $L_{or}$ and the reference beam $L_{ref}$ so as to generate an equivalent light source PI (which in this instance is virtual).

FIGS. 12A and 12B illustrate an example of the overlap of the reflected object beam $L_{or}$ and of the reference beam $L_{ref}$ on the detector Det for an optical imager Im of the triple Gauss type. The intermediate image plane PI is situated respectively on the plane of the aperture diaphragm Diaph and before the first group of lenses of the optical imager Im. It must be appreciated that the optical imager Im is not restricted to a triple Gauss system but may be any other type of objective known to those skilled in the art.

The two subbeams $SF_1$ and $SF_2$ ($L_{or,1}$, $L_{or,2}$) here are the full-light edge-of-field beams of the reflected object beam $L_{or}$, respectively illuminating the pixels $P_1$ and $P_2$ of the detector Det. The lateral dimension of the intermediate image PI is given by the segment [S1S2], which is to say the lateral dimension of the intersection of the subbeams $SF_1$, $SF_2$ at the intermediate image plane PI. Emission cones with similar divergence for three source points are illustrated by way of example. Also depicted is the subbeam $L_{ref,1}$, which is the portion of the reference beam $L_{ref}$ that reaches the pixel $P_1$ concerned. As mentioned previously, the configuration of FIG. 12B is advantageous from the viewpoint of structural accessibility of the intermediate image plane PI (particularly in the guided optics configuration), whereas the configuration of FIG. 12A is more optimal for obtaining flat-tint interferences on the array of pixels. Specifically, the angular deviation between the reference beam $L_{ref,1}$ and the subbeam $SF_1$ of the reflected object beam $L_{or,1}$ is smaller in the 12A configuration than in the 12B configuration.

Figure 13:
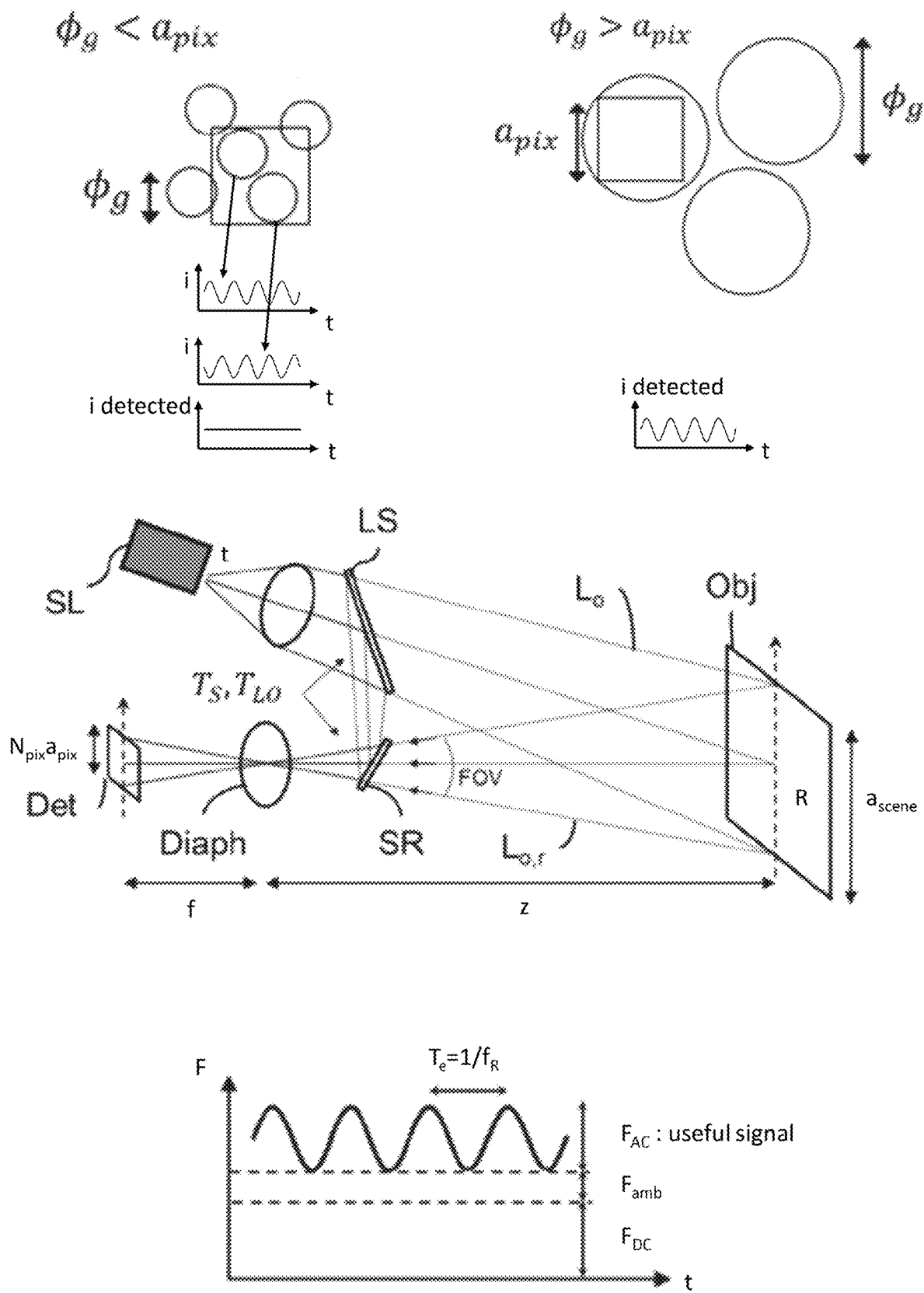
FIG. 13 is a schematic view of an imaging system according to one embodiment of the invention revealing the impact on the intensity of the detected heterodyne signal that the speckles can have depending on their size.

FIG. 13 depicts various elements of the imaging system D according to one embodiment, and demonstrates the effect of speckles on the detection of the heterodyne signal. The scene Obj observed still in practice has a certain degree of roughness. Because the imaging system D works on coherent imaging, a speckle pattern (laser granulation) thus forms in the image focal plane of the detector Det. The characteristic size of the speckles may then impact the quality of the measurement of the detected heterodyne signal. The phase of the reflected object beam is substantially constant within a speckle, but is random between different speckles. Thus, the heterodyne-signal oscillations generated by interference between the reflected object beam and the reference beam are at the same frequency for adjacent speckles but are randomly phase-shifted between the speckles.

Thus, if several speckles are present in the one same pixel, the photodiode which indifferently integrates all the contributions will supply an averaged signal having an AC component that is reduced, or even eliminated (for example in the case of two speckles in phase opposition: cf. FIG. 11: the case where $\phi_g < a_{pix}$). Here, $\phi_g$ is the mean size of a speckle in the plane of the detector Det, and $a_{pix}$ is the lateral size of a pixel (for example here of a microlens situated above a photodiode). Conversely, in instances in which the diameter $\phi_g$ of the speckles is greater than the size $a_{pix}$ of the photodetector (cf. FIG. 11: scenario in which $\phi_g > a_{pix}$), the contrast in oscillations is greater, and therefore more favorable to good detection of heterodyne signal.

Also, in one embodiment of the invention, the surface area (or size) of the photodetector is less than the surface area (or mean size) of the speckles. The mean size $\phi_g$ of the speckle in the image of a diffusing object has a statistical mean of $2 \times \lambda \times f_\#$, where $\lambda$ is the wavelength of the laser source, and $f_\#$ is the aperture number of the optical imager Im. Thus, in this embodiment of the invention, the numerical aperture of the optical imager Im is designed so that the mean size $\phi_g$ of the speckles on the detector Det is greater than a characteristic dimension $a_{pix}$ of the photodetector of each pixel of the detector. What is meant by characteristic dimension is, for example, the side length of a square photodetector (in this instance the side length of the associated microlens).

The following passage describes the parameters and typical performance of the imaging system D according to one embodiment of the invention. The parameter value used is nonlimiting and given merely by way of example.

In this example, it is assumed that the predetermined maximum range of the scene with respect to the detector Det is z=10 m. It is assumed that the desired resolution in terms of range is 5 cm, and this fixes the excursion of the optical frequency of the laser as $$B \approx \frac{c}{2\delta z} \sim 3 \text{ GHz.}$$

In order to operate at video speeds, it is desired to create a range image of the scene in 1/50 Hz=20 ms at most. The duration T of the optical frequency ramp of the source is therefore 20 ms. Alternatively, the duration T of the ramp may be a submultiple of 20 ms, in order to be able to perform several ramps in this duration T, establish measurement statistics and thus improve the precision of the measurements. However, doing that is possible only if the signal and the signal-to-noise ratio are sufficient.

The gradient of the ramp is 0.15 MHz/µs, which is a value readily accessible by modulating the injection current of a semiconductor laser. The frequency of the oscillations that will be detected by the pixels of the detector is $$f_R = \frac{2Bz}{cT} \sim 10 \text{ kHz:}$$

the period of these oscillations $1/f_R \approx 100$ µs.

In the case of a field of view FOV of 26×19° (32° on the diagonal) and an optical imager Im with a focal length f=7 mm, the minimum size of the detector Det is therefore equal to 2×f×tan(FOV/2)=3.2×2.4 mm. For a VGA (640×480 pixels) format, the pixel size is therefore 5×5 µm.

In the case of a laser wavelength A of 1300 nm (with, for example, a germanium or InGaAs detector), the aperture number $f_\#$ of the optical imager Im is preferably greater than 1.9 in order thus to have a characteristic speckle size $\phi_g$ in the image plane that is greater than the pixel size $a_{pix}$ of the detector Det. What is selected for example is $f_\#$=2 with a pupil Diaph of the optical imager Im of 3.5 mm.

The power of the laser of the object beam $L_o$ is equal for example to 10 mW, a value that meets retina safe standards at 1300 nm. A ratio $T_S$ of 95%/5% between the emitted powers of the object/reference paths is chosen, for example, giving a power of 0.5 mW on the reference beam $L_{ref}$.

Considering a 20% Lambertian diffuse reflectance factor for the scene Obj and an optical recombiner which is a semireflective cube with a $T_{LO}$ ratio equal to 95%/5% for recombination, the fraction of the power of the portion $L_{or,i}$ of the reflected object beam that is incident upon each pixel $P_i$ with respect to the object power emitted is $10^{-15}$. This ratio is extremely small despite the relatively large aperture of the optical imager Im because a large proportion of the light of the object path is diffused outside of the pupil of this optic, the portion passing through the pupil then being shared between all the pixels $P_i$ of the detector Det. The fraction of the power of the reference path that is incident in each pixel is markedly higher, here of the order of $10^{-6}$.

It is now assumed that the photodetector Ph is an InGaAs photodiode with a quantum efficiency QE of 70% at 1300 nm. In addition, in order to conform to Shannon's theorem, the integration time (the inverse of the sampling frequency) is equal to one third of a period $1/f_R$. The next equation allows the photon flux F on one pixel $P_i$ of the detector to be calculated:

$$F = \underbrace{\left(\sqrt{\rho_S} - \sqrt{\rho_{LO}}\right)^2 F_t}_{F_{DC}} + \underbrace{4\sqrt{\rho_S \rho_{LO}} F_t \cos^2(\pi f_R t + \varphi)}_{F_{AC}} + \underbrace{\frac{\mathcal{R} T_{opt}}{4 f_\#^2} E_{sun} a_{pix}^2}_{F_{amb}}$$

$$\rho_S = \frac{\mathcal{R} T_s T_{opt} \phi_{opt}^2}{4 N_{pix}^2 z^2} \quad \rho_{LO} = \frac{T_{LO} T_{opt}}{N_{pix}^2}$$

where R is the reflectance of the Lambertian scene, and $T_S$, $T_{LO}$ and $T_{opt}$ are the transmission of the optical splitter LS, of the optical recombiner SR and of the optical imager Im respectively and $\phi_{opt}$ is the diameter of the pupil of the optical imager Im, $N_{pix}$ is the number of pixels of the detector, and $E_{sun}$ is the illumination from the sun.

Following detection of the heterodyne signal, the continuous component DC of the detected signal (which is to say the electronic signal of the mean flux of the object path and of the reference path incident on the pixel) obtained during the integration time is $F_{DC}$=13 000 electrons. The alternating component AC, i.e. the useful signal $F_{AC}$, (the electronic signal indicative of the beating) modulated at the frequency $f_{Rmax}$, carrying the range information varies between 15 and 140 electrons depending on the (unpredictable) positioning of the integration times within the sinusoidal signal.

The dominant noise is the noise of photons on the reference path at each of the pixels, corresponding to approximately 100 electrons (equal to $\sqrt{F_{DC}}$) in the integration time. The noise of photons in the ambient parasitic light $F_{amb}$ is smaller (20 electrons of noise with sunlight filtered through a bandpass filter of width 50 nm centered on the wavelength of the laser). The dark current noise (approximately 10 electrons with a dark current of 1 pA) and the reading noise (a few electrons) are likewise far lower than the photon noise. This being so, the signal-to-noise ratio, of the order of 1 or even below, is compatible with the detection and counting of the peaks in the useful signal $F_{AC}$.

In the case of a single-point FMCW LIDAR imaging system which scans a scene (angular sweep) with VGA resolution at video speed, having the same parameters as those used in the previous calculation, the signal-to-noise ratio is similar. However, the detector would need to have a pass band of at least 10 GHz, which is possible but restrictive, and the laser source would need to be able to be wavelength modulated at a frequency of several tens of MHz with a modulation amplitude of several GHz as explained previously. In addition, the illumination device would need to sweep the scene at a rate of several MHz. These values are not really compatible with present-day technology.

The invention claimed is:

1. A coherent LIDAR imaging system comprising:
a laser source configured to emit laser radiation having a time modulated optical frequency;
an optical splitter/recombiner comprising at least:
   an optical splitter configured to spatially split the laser radiation into a reference beam directed toward an optical imager and into an object beam directed toward a scene that is to be illuminated; and
   an optical recombiner configured to spatially superpose the reference beam on part of the object beam reflected by the scene, referred to as reflected object beam;
the optical imager having an optical axis creating an image of the illuminated scene on a detector by focusing the reflected object beam,
the detector comprising an array of pixels, each of the pixels comprising a photodetector configured to detect a portion of the reflected object beam and a portion of the reference beam which together form a portion of a recombined beam having a beat frequency representative of a range of the illuminated scene; and
a processor connected to the detector and to the laser source and configured to determine a range of points in the scene, imaged on the pixels and to construct a range image of the scene, from the beat frequency associated with each pixel and from the modulated optical frequency of the laser radiation;
wherein:
   the optical splitter/recombiner is further configured to form an intermediate image of the reference beam in an intermediate image plane perpendicular to the optical axis,
   the position of the intermediate image plane on the optical axis being comprised in a segment along the optical axis corresponding to a projection onto the optical axis of a zone of intersection of subbeams of the reflected object beam, the subbeams being full-light edge-of-field beams.

2. The imaging system as claimed in claim 1, wherein the optical splitter/recombiner is configured so that the intermediate image plane is coincident with a plane containing a pupil or an aperture diaphragm of the optical imager.

3. The imaging system as claimed in claim 1, wherein the optical splitter/recombiner is configured so that a lateral dimension of the intermediate image is less than or equal to a lateral dimension of the intersection of the subbeams in the intermediate image plane.

4. The imaging system as claimed in claim 1, wherein the optical splitter/recombiner is configured so that a divergence of the reference beam coming from the optical splitter/recombiner is equal to an angle formed by the subbeams in the intermediate image plane.

5. The imaging system as claimed in claim 1, wherein the optical splitter/recombiner is configured so that, for each pixel, an axis of propagation of the portion of the reflected object beam forms, with an axis of propagation of the portion of the reference beam, an angle θ such that $θ<λ/(2×a_{pix})$, where $a_{pix}$ is a characteristic dimension of the photodetector of each pixel of the detector and λ is a wavelength of the laser radiation.

6. The imaging system as claimed in claim 1, comprising an optical shaper placed in a path of the laser radiation or of the object beam and configured so that a beam coming from the optical shaper displays uniform illumination of the scene that is to be observed.

7. The imaging system as claimed in claim 1, wherein the optical imager has a numerical aperture such that a diameter of speckles on the detector is greater than a characteristic dimension of the photodetector of each pixel of the detector.

8. The imaging system as claimed in claim 1, wherein the laser source is configured so that the optical frequency is modulated by a periodic linear ramp of excursion B and duration T and so that a coherence length of the laser radiation is twice as high as a predetermined maximum distance $z_{max}$ between the scene that is to be illuminated and the imaging system.

9. The imaging system as claimed in claim 8, wherein each pixel comprises an electronic processing circuit designed to calculate the beat frequency of the portion of the recombined beam.

10. The imaging system as claimed in claim 9, wherein, with the calculation of the beat frequency being performed simultaneously for all the pixels of the detector, each pixel comprising an interconnection layer in a dielectric material transparent to the recombined beam, the interconnection layer comprising metallic interconnections connected to the electronic processing circuit, the interconnection layer being arranged on a side of the photodetector opposite to a side detecting the portion of the recombined beam, the electronic circuit associated with the pixel being configured to:
  collect a photocurrent generated in the photodetector representative of the beat frequency and convert the photocurrent into a voltage, then
  substitute a DC component of the signal representative of the beat frequency with a predetermined fixed voltage value, generating a substituted signal; then
  amplify the substituted signal, generating an amplified signal;
  detect, using a comparator, peaks or rising fronts or falling fronts of the amplified signal, and
  proceed to count a number of detected periods, and transmit to the processor a signal representative of the count of the number of detected periods,
  the processor determining a range of a point in the scene by calculating a number of periods detected over the duration T of the optical frequency modulation from the signal representative of the count.

11. The imaging system as claimed in claim 9, wherein a pixel sampling frequency is greater than two times a frequency $F_{R,max}$ corresponding to the beat frequency associated with an object in the scene which is situated at a maximum predetermined range $z_{max}$, and such that $F_{R,max}=2BZ_{max}/CT$, where c is the speed of light.

12. The imaging system as claimed in claim 1, wherein the optical splitter comprises a first integrated optical circuit in which the laser radiation is coupled, at least one waveguide of the first integrated circuit guiding the reference beam, the first integrated optical circuit further comprising a plurality of waveguides each comprising at least one diffraction grating so as to form the object beam.

13. The imaging system as claimed in claim 12, wherein the optical recombiner comprises a second integrated optical circuit, in which the reference beam is coupled by means of an optical element, the second integrated optical circuit comprising at least one waveguide comprising at least one reference grating, the reference grating coupling the reference beam to free space and to the optical imager, the second integrated optical circuit being positioned in the intermediate image plane so that the reference grating forms the intermediate image.

14. The imaging system as claimed in claim 13, wherein the optical element is an optical fiber, guiding the reference beam coming from the first integrated optical circuit toward the second integrated optical circuit.

15. The imaging system as claimed in claim 1, wherein the optical splitter/recombiner comprises an integrated optical circuit in which the laser radiation is coupled, the integrated optical circuit comprising the optical splitter and the optical recombiner,
  the optical splitter comprising a plurality of waveguides of the integrated optical circuit and each comprising at least one diffraction grating, referred to as object grating, the object gratings coupling the object beam to free space and to the scene that is to be observed, and
  at least one reference waveguide of the integrated circuit guiding the reference beam toward the optical recombiner comprising at least one reference grating situated on the reference waveguide, the integrated optical circuit being arranged in the intermediate image plane so that the reference grating forms the intermediate image.

16. The imaging system as claimed in claim 1, wherein the optical splitter/recombiner further comprises an intermediate optical device, positioned after the optical splitter, and before the optical recombiner, the intermediate optical device being designed to focus the reference beam and form the intermediate image.

17. An imaging method using a coherent LIDAR imaging system, comprising the following steps:
  emitting laser radiation from a laser source having a time-modulated optical frequency;
  spatially separating, using an optical splitter of an optical splitter/recombiner, the laser radiation into a reference beam and into an object beam directed toward a scene that is to be illuminated;
  spatially superposing, using an optical recombiner of the optical splitter/recombiner, a reflected object beam reflected by the scene and the reference beam;
  creating, using an optical imager, an image of the scene on a detector by focusing the reflected object beam, the detector comprising an array of a plurality of pixels;
  detecting, on each of the pixels, a portion of the reflected object beam and a portion of the reference beam which together form a portion of a recombined beam having a beat frequency representative of a range of the illuminated scene;

the optical splitter/recombiner being configured to form an intermediate image of the reference beam in an intermediate image plane perpendicular to an optical axis, the position of the intermediate image plane on the optical axis being comprised in a segment along the optical axis corresponding to a projection onto the optical axis of a zone of intersection between subbeams of the reflected object beam, said subbeams being full-light edge-of-field beams; and determining, using a processor connected to the detector and to the laser source, a range to points of the scene which are imaged on the pixels and constructing a range image of the scene from the beat frequency) associated with each pixel and from the modulated optical frequency of the laser radiation.

* * * * *